United States Patent [19]
Henderson et al.

[11] 3,980,760
[45] *Sept. 14, 1976

[54] RECOVERY OF SULFUR DIOXIDE FROM GAS MIXTURES

[75] Inventors: James M. Henderson, New Brunswick, N.J.; William H. Wetherill, Staten Island, N.Y.

[73] Assignee: Asarco Incorporated, New York, N.Y.

[ * ] Notice: The portion of the term of this patent subsequent to May 25, 1993, has been disclaimed.

[22] Filed: Sept. 3, 1974

[21] Appl. No.: 503,012

Related U.S. Application Data

[63] Continuation-in-part of Ser. No. 446,081, Feb. 26, 1974.

[52] U.S. Cl............................ 423/539; 423/236; 423/243; 423/245
[51] Int. Cl.$^2$.......................................... C01B 17/48
[58] Field of Search ........... 423/242, 243, 539, 541, 423/541 A, 545, 236, 245

[56] References Cited
UNITED STATES PATENTS

| 1,972,074 | 9/1934 | Boswell............... | 423/243 |
|---|---|---|---|
| 2,047,819 | 7/1936 | Boswell et al........... | 423/243 |
| 2,128,027 | 8/1938 | Clark.................. | 423/243 |
| 2,186,453 | 1/1940 | Gleason et al......... | 423/539 |
| 2,295,587 | 9/1942 | Fleming et al........ | 423/539 |
| 2,399,013 | 4/1946 | Fleming et al........ | 423/539 |
| 3,330,621 | 7/1967 | Uian-Ortuno et al.... | 423/242 |
| 3,790,660 | 2/1974 | Earl et al............ | 423/244 |

FOREIGN PATENTS OR APPLICATIONS

| 669,966 | 9/1963 | Canada.............. | 423/541 A |

OTHER PUBLICATIONS

"SO$_2$ Absorber: Two Scrubs Better Than One", Chem. Engineering, Feb. 1955, pp. 132–133.

Primary Examiner—Oscar R. Vertiz
Assistant Examiner—Wayne A. Langel
Attorney, Agent, or Firm—R. J. Drew; E. J. Schaffer

[57] ABSTRACT

Ammonia is added to combined aqueous scrubbing solutions containing an organic base-sulfuric acid reaction product, preferably an aromatic amine-sulfuric acid reaction product, an organic base-sulfurous acid reaction product, preferably an aromatic amine-sulfurous acid reaction product, and water in one or more separating zones located exteriorly of an absorption tower. The combined aqueous scrubbing solutions are obtained from sulfurous acid and sulfuric acid solution scrubbing sections of the absorption tower wherein an organic base, preferably an aromatic amine, is utilized as absorbent in a lower absorber section of the tower to remove SO$_2$ from a SO$_2$-containing gas mixture, followed by scrubbing the SO$_2$-depleted, aromatic amine-enriched gas from the absorber section first with sulfurous acid solution in the sulfurous acid scrubbing section of the tower to remove most of the gaseous aromatic amine therefrom and then with dilute sulfuric acid solution in the sulfuric acid scrubbing section of the tower, to remove a major portion of the residual gaseous aromatic amine from the gas. Liquid sulfuric acid solution containing a relatively high concentration of aromatic amine-sulfuric acid reaction product is withdrawn from the lowermost tray in a preferred tray-equipped tower scrubbing section, and a major portion, i.e. more than 50%, of this withdrawn sulfuric solution is passed back to and introduced preferably onto the fourth or third tray from the top of the tray-equipped scrubbing section. Liquid sulfuric acid solution containing a relatively low concentration of aromatic amine-sulfuric acid reaction product is also withdrawn from preferably the second tray or third tray from the top of this section when the introduction of the returned acid solution is onto respectively the third tray or fourth tray from the top of the section, and such withdrawn acid solution having the relatively low concentration of aromatic amine-sulfuric acid reaction product is returned and introduced onto the top tray of this sulfuric acid scrubbing section. The sulfur dioxide is stripped from the pregnant aromatic amine absorbent from the absorbing section in the stripping section of a stripping tower. The ammonia treatment of the combined aqueous scrubbing solutions in the external separating zone results in release of the aromatic amine from the aromatic amine-sulfuric acid reaction product by reaction of the ammonia with the aromatic amine-sulfuric acid reaction product and also in the formation of ammonium sulfate. Aqueous liquid solution containing the ammonium sulfate and aromatic aminesulfurous acid reaction product is withdrawn from a lower layer thereof, which is beneath an upper layer of released aromatic amine, in the separating zone and passed to the regenerator section of a stripping tower. Aromatic amine vapor and SO$_2$ gas are liberated in the regenerator section and a considerable quantity of steam is generated therein. Aqueous solution containing ammonium sulfate is withdrawn from the lower portion of the regenerator section and, after bleeding off only a small portion of this aqueous solution, is passed, after cooling, into the upper portion of the sulfurous acid scrubbing section of the absorption tower and introduced therein. SO$_2$ gas, obtained in the process, is supplied into the lower portion of this sulfurous acid scrubbing section and is dissolved in water of the introduced aqueous ammonium sulfate solution to form sulfurous acid.

In another embodiment, the effluent gas from the sulfuric acid scrubbing section of the tower is scrubbed in alkali metal carbonate scrubbing section of the tower with a liquid alkali metal carbonate solution, e.g. a dilute aqueous sodium carbonate solution.

32 Claims, 2 Drawing Figures

RECOVERY OF SULFUR DIOXIDE FROM GAS MIXTURES

CROSS-REFERENCES TO RELATED APPLICATIONS

This is a continuation-in-part of our co-pending application Ser. No. 446,081, filed Feb. 26, 1974.

BACKGROUND OF THE INVENTION

1. Field of the Invention

This invention relates to the recovery of sulfur dioxide and more particularly to a new and improved process for recovering sulfur dioxide from gas mixtures containing sulfur dioxide.

2. Description of the Prior Art

Sulfur dioxide has been recovered from gas mixtures heretofore by intimately contacting the gas mixture in an absorber with an organic base, for example an aromatic amine, e.g. dimethyl aniline, as absorbent. The effluent gas containing gaseous aromatic amine from the absorbing step is then scrubbed with a soda solution in a soda scrubber to remove residual sulfur dioxide from the gas as sodium sulfite followed by scrubbing the gas with dilute sulfuric acid solution in a sulfuric acid scrubber to remove the aromatic amine from the gas mixture as the aromatic amine sulfate, e.g. dimethylaniline sulfate. The sulfur dioxide is stripped from the absorbent, and the expelled sulfur dioxide is subsequently recovered in purified, anhydrous, liquefied state. The aqueous effluent solution from the soda scrubber containing sodium sulfite and sodium acid sulfite or sodium and sodium carbonate and the aqueous effluent solution from the sulfuric acid scrubber containing aromatic amine sulfate are combined in a collecting tank, wherein the aromatic amine per se is released from the aromatic amine sulfate and sodium sulfate is formed by reaction of the aromatic amine sulfate separately with the sodium sulfite or sodium sulfite and sodium carbonate present in the combined solutions. The combined liquid in the collectng tank is then passed to a separating tank wherein the released aromatic amine and an aqueous solution layer separate by gravity separation as separate liquid layers. The liquid aromatic amine is withdrawn from its separate layer in the separating tank and passed to the absorbent supply tank for re-use in the absorber for absorbing sulfur dioxide from the gas mixture. Aqueous solution is withdrawn from the aqueous solution layer in the separating tank and passed to the regenerator wherein aromatic amine is released from aromatic amine sulfite contained in the aqueous solution by heating, and steam is generated which is utilized for stripping the sulfur dioxide from the pregnant aromatic amine. Waste aqueous solution containing sodium sulfate is withdrawn from the bottom of the regenerator and consequently considerable quantities of this potentially polluting sodium sulfate-containing waste solution is required to be disposed of without causing undue pollution. As a modification of the aforementioned prior art process, the soda scrubber may be omitted and sodium sulfite or another compound, e.g. sodium carbonate, which will react with the aromatic amine sulfate to result in the release of the aromatic amine and the formation of sodium sulfate may be mixed with the aqueous solution from the sulfuric acid scrubber and a part or all of a water phase separated from the stripped aromatic amine absorbent. The released aromatic amine separates as a separate layer from an aqueous solution layer containing the sodium sulfate and aromatic amine sulfite as aforementioned, and the separated aqueous solution is passed to the regenerator as is hereinbefore described. Considerable quantities of waste aqueous solution containing sodium sulfate are also withdrawn from the bottom portion of the regenerator in this modification, and this considerable sodium sulfate-containing waste solution is also required to be disposed of without causing undue pollution. The aforementioned process and modification thereof are disclosed in U.S. Pat. No. 2,399,013, and although these processes give good results in recovering sulfur dioxide from gas mixtures, the processes leave room for improvement. In the first place, the considerable quantities of waste aqueous solution containing sodium sulfate that are produced are a nuisance and require a considerable monetary expenditure to dispose of such waste solution without undue pollution. Furthermore, considerable amounts of sulfuric acid solution are required to be purchased at considerable expense for scrubbing the effluent gas to remove gaseous aromatic amine.

Other prior art processes for recovery of sulfur dioxide from gas mixtures and which result in the disadvantageous formation of considerable quantities of sodium sulfate-containing waste aqueous solution required to be disposed of, as well as employing sulfuric acid solution as sole scrubbing liquid for removing aromatic amine absorbent from the effluent gas from the $SO_2$ absorbing step are disclosed in U.S. Pat. Nos. 2,186,453 and 2,295,587.

It is also known in the prior art to use lime for treating the aqueous scrubbing solution from the sulfuric acid scrubber to release the organic base absorbent and to form calcium sulfate. The main problem with the lime treatment is that serious problems are encountered in handling the waste liquid containing the formed calcium sulfate, in that serious scale build up occurs in the process equipment, especially in the heat exchangers, due to the calcium sulfate. Because of this the use of lime for treating the aqueous acid scrubbing solution in the process is undesirable and disadvantageous. U.S. Pat. No. 2,128,027 discloses the use of lime or another calcium compound in the presence of $SO_2$ and a neutral sulfate, e.g. sodium sulfate, potassium sulfate or ammonium sulfate, for treating the aqueous solution, after separation from the organic base, to precipitate sulfate ions as calcium sulfate, and liberate organic base which immediately forms a soluble sulfite.

U.S. Pat. Nos. 1,972,074 and 2,047,819 disclose washing effluent gas from the $SO_2$-absorber tower with sulfuric acid, hydrochloric acid or sulfurous acid to remove organic base absorbent from the gas.

BRIEF SUMMARY OF THE RELATED APPLICATION

U.S. Pat. Application Ser. No. 446,081 of James M. Henderson and William H. Wetherill, filed Feb. 26, 1974, discloses and claims a new process for the recovery of sulfur dioxide from gas mixtures which is a considerable improvement over the prior art processes hereinbefore alluded to. The process of Ser. No. 446,081, comprises absorbing sulfur dioxide from the gas mixture containing the same by contacting the gas mixture in an absorption zone with a liquid water-insoluble organic base absorbent, for example water-insoluble aromatic amine absorbent, capable of liberating or releasing the sulfur dioxide gas upon subsequent treatment such as, for example, stripping with a gaseous stripping medium, of heating, or subjecting the SO$_2$-pregnant absorbent to reduced pressure. The sulfur dioxide-pregnant organic base absorbent withdrawn from the absorption zone is treated to cause the sulfur dioxide to be released from the liquid absorbent. The sulfur dioxide-impoverished, organic base-enriched effluent gase from the absorbing step or zone is scrubbed in a sulfurous acid scrubbing zone with a sulfurous acid-and ammonium sulfate-containing aqueous solution to remove the major portion, i.e. more than 50%, of the gaseous organic base absorbent from the gas. The sulfurous acid is provided in the sulfurous acid scrubbing zone by supplying a sulfur dioxide-containing gas into such scrubber zone, ordinarily into the lower portion of an upright scrubber zone, and separately supplying liquid aqueous solution containing ammonium sulfate into this scrubbing zone. The sulfur dioxide gas is dissolved in the water of the aqueous ammonium solution in this scrubbing zone to form the sulfurous acid-and ammonium sulfate-containing aqueous scrubber solution therein. The effluent gas containing a small amount of residual gaseous organic base absorbent from the last-mentioned scrubbing zone is scrubbed with dilute sulfuric acid solution in a sulfuric acid scrubbing zone to remove substantially all or a major portion, i.e. more than 50%, of the residual gaseous organic base absorbent from the gas. The sulfurous acid scrubbing solution contaning organic base-sulfurous acid reaction product from the sulfurous acid scrubbing zone and the sulfuric acid scrubbing solution containing organic base-sulfuric acid reaction product from the sulfuric acid scrubbing zone are combined. Sulfur dioxide is stripped from the organic base absorbent in a stripping zone and the liberated sulfur dioxide is recovered. Ammonia is added to the combined scrubbing solutions in a separating zone, the ammonia addition resulting in the organic base being released from the organic base-sulfuric acid reaction product and the formation of ammonium sulfate in the separating zone. Liquid organic base is separated from an aqueous liquid phase in the separatng zone, and the separated liquid organic base is withdrawn from the separating zone and returned ultimately to the sulfur dioxide-absorbing step.

BRIEF SUMMARY OF THE INVENTION

In accordance with the present invention, a still further improved process for the removal of sulfur dioxide from gas mixtures over the prior art processes hereinbefore referred to is attained, and which is a considerable improvement over such prior art processes and which is also a material improvement over the process of our co-pending U.S. Patent Application Ser. No. 446,081, by withdrawing liquid sulfuric acid solution containing a relatively high concentration of organic base-sulfuric acid reaction product from a lower portion of the sulfuric acid upright scrubbing zone and passing a substantial portion, usually a major portion, i.e. more than 50%, of this withdrawn sulfuric acid solution back to and introducing the same into an intermediate or upper portion of this sulfuric acid scrubbing zone. Liquid sulfuric acid solution containing a relatively low concentration of organic base-sulfuric acid reaction product is also withdrawn from an intermediate or upper portion of the sulfuric acid scrubbing zone at a point of withdrawal spaced above and adjacent to the point of introduction therein of the returned sulfuric acid solution containing the relatively high concentration of organic base-sulfuric acid reaction product but spaced a sufficient distance from this introduction point so as not to interfere with the introduction of such returned sulfuric acid solution therein, and this withdrawn sulfuric acid solution having the relatively low concentration of organic base-sulfuric acid reaction product is passed back to the top portion of the sulfuric acid scrubbing zone and introduced therein. By virtue of such passage of the dilute sulfuric acid solution containing the relatively high concentration of organic base-sulfuric acid reaction product and relatively low concentration of organic base-sulfuric acid reaction product from the lower and from the intermediate or upper portions respectively of the sulfuric acid scrubbing zone to the intermediate or upper portion and the top portion respectively of such scrubbing zone, the following improvements are attained:

1. the minimum organic base, e.g. dimethylaniline, level in the exit gas is achieved by maintaining a low concentration of the organic base in the liquid on the top trays, whereby the exit gas is in contact with a low dimethylaniline-content liquid;
2. the high dimethylaniline content of the solution on the lower trays permits the minimum volume of solution to be removed from the scrubber system, and thus the minimum acid consumption for a given weight of dimethylaniline recovered; and
3. by recycling solution having a relatively high concentration of organic base-sulfuric acid reaction product, the corrosive nature of the scrubbing solution is reduced.

The quantities of sulfuric acid solution having the relatively high concentration of organic base-sulfuric acid reaction product and of sulfuric acid solution having the relatively low concentration of organic base-sulfuric acid reaction product which are withdrawn respectively from the lower portion and the intermediate or upper portion of the vertically elongated sulfuric acid scrubbing zone and returned and introduced into respectively the intermediate or upper portion and the top portion of this scrubbing zone, are sufficient to provide sufficient liquid sulfuric acid solution in this scrubbing zone for good contact with the upwardly flowing effluent gas from the sulfurous acid scrubbing zone to effect the absorption removal of a major portion, i.e. more than 50%, if not substantially all of the residual organic base from the effluent gas.

When a tray-equipped vertically elongated scrubbing column or tower is employed as the sulfuric acid scrubbing zone, which is preferably the case, the quantities of such withdrawn sulfuric acid solution of relatively high organic base-sulfuric acid content and of relatively low sulfuric acid content returned to and introduced into respectively the intermediate or upper portion and the top portion of this scrubbing zone are sufficient to fill or substantially fill and maintain all trays of this scrubbing column filled or substantially filled with liquid pools of the acid solution. Consequently there is achieved good contact of the liquid acid solution with the upwardly flowing effluent gas, thereby to effect absorptive removal of a major portion, i.e. more than 50%, or substantially all, of the residual gaseous organic base from the effluent gas.

A liquid organic base absorbent-water mixture, for example an aromatic amine-water mixture, is ordinarily passed from the stripping zone to a separating zone wherein the organic base absorbent is separated from the water.

The process of this invention is also especially meritoreous and a considerable improvement in this art by reasons of considerable reducing the amount of potentially polluting sulfate-containing solution from the regenerator that is discharged to waste, and also by considerably reducing the amount and hence the expense of sulfuric acid reagent required to be purchased for the sulfuric acid solution scrubber as well as the amount and hence the expense of the base required for neutralizaton of that acid. The amount of soluble sulfate salt in the waste aqueous solution stream from the regenerator required to be disposed of may be reduced by as much as 90% by virtue of this invention. Further, the amount of sulfuric acid required to be purchased for the sulfuric acid scrubber of this invention may be reduced by as much as 95% of the quantity of sulfuric acid required to be purchased for the sulfuric acid scrubber of the prior art processes.

The soluble reaction product of the organic base, for example the aromatic amine, e.g. dimethylaniline, with the sulfuric acid of the dilute sulfuric acid solution is referred to from time to time herein as the organic base sulfate or aromatic amine sulfate or dimethylaniline sulfate respectively. The soluble reaction product of the organic base, for example the aromatic amine, e.g. dimethylaniline, with sulfurous acid of the dilute sulfurous acid solution is referred to from time to time herein as the organic base sulfite or aromatic amine sulfite or dimethylaniline sulfite respectively.

A major portion, i.e. more than 50% by volume, of the liquid aqueous ammonium sulfate-containing solution withdrawn from the regenerator zone is usually passed to the sulfurous acid scrubbing zone. A quantity in the range of about 60% to about 90% by volume of the withdrawn liquid aqueous ammonium sulfate-containing solution from the regenerator zone is ordinarily passed to the sulfurous acid scrubbing zone. All or substantially all of the withdrawn liquid aqueous ammonium sulfate solution from the regenerator zone can, for a short or limited time, be passed to this sulfurous acid scrubbing zone. A portion which is less than 50% by volume of the withdrawn liquid aqueous ammonium sulfate-containing solution can, if desired, be passed to the sulfurous acid scrubbing zone, but this is not preferred as it does not reduce the quantity of potentially polluting waste ammonium sulfate-containing solution to be disposed of to the extent that passing a major portion or more of such withdrawn liquid ammonium sulfate-containing solution to the sulfurous acid scrubbing zone does.

The passage of the ammonium sulfate aqueous solution from the regenerator zone to the sulfurous acid scrubbing zone, in addition to considerably reducing the amount of waste solution from the regenerator zone to be disposed of, is also a considerable improvement in that the presence of ammonium sulfate in this scrubbing zone considerably enhances the dissolution of the $SO_2$ gas in water to form sulfurous acid and also enhances the recovery of organic base, e.g. aromatic amine, in this sulfurous acid scrubbing zone. Thus the presence of the ammonium sulfate results in dissolution of greater quantities of $SO_2$ in water to form the sulfurous acid in this scrubbing zone than in the absence of the ammonium sulfate. Due to the formation of greater quantities of sulfurous acid solution in this scrubber zone, there is appreciably greater recovery of organic base, e.g. aromatic amine, in this scrubbing zone.

The amount of ammonia added to the combined aqueous solutions or aqueous solution in the separator zone or zones is an amount thereof sufficient to result in the liberation of the organic base, e.g. the aromatic amine, from the organic base-sulfuric acid reaction product, e.g. the aromatic amine sulfate reaction product, present in the aqueous solution therein and also the formation of ammonium sulfate in the aqueous solution. The ammonia usually added to the combined aqueous solutions in the separating zone or zones is equivalent to the total content of sulfate radical, i.e. $SO_4$, present in the combined aqueous solutions therein. This total content of sulfate radical is the content of sulfate radical present in the organic base-sulfuric acid reaction product, e.g. the aromatic amine sulfate reaction product, from the sulfuric acid scrubbing zone, plus any organic base sulfate usually passing from the sulfurous acid scrubbing zone due to oxidation of a small amount of the organic base-sulfurous acid reaction product which usually occurs in such scrubbing zone, plus any organic base sulfate usually passing from the $SO_2$-absorber zone by way of the stripping zone, plus any organic base sulfate that may be formed in the stripping zone and/or rectifying zone and passing from the stripping zone. Although more than such equivalent amount of ammonia can be added to the combined aqueous solutions in the separating zone or zones, if desired, it is essential that the total amount of ammonia which is added to these combined aqueous solutions in the separating zone or zones should be insufficient to result in the combined aqueous solutions or aqueous solution retaining a significant amount of sulfur dioxide in the regenerating zone due to the presence of excess ammonia.

Ammonia is usually utilized in the present invention as ammonia gas. However the ammonia can, if desired, be utilized in this invention when dissolved in water, i.e. as ammonium hydroxide.

The ammonia is added to the combined aqueous solutions containing the organic base-sulfurous acid reaction product and the organic base-sulfuric acid reaction product from the scrubbing zones either in a single separating zone, or in two or more separating zones or stages. When a plurality of separating zones or stages are utilized, which is preferred, usually two separating zones or stages are employed.

The sulfur dioxide-containing gas supplied into the sulfurous acid scrubbing zone, is ordinarily and preferably sulfur dioxide gas obtained from elsewhere in the process although it may be obtained from a source other than the process, and is in addition to the sulfur dioxide contained in the sulfur dioxide-impoverished effluent gas passing into this scrubber zone from the sulfur dioxide absorbing step. And this is important from an economic standpoint, inasmuch as considerably less sulfuric acid is required to be purchased for the sulfuric acid scrubbing which follows and hence the expense of the larger amount of sulfuric acid and $NH_3$ is eliminated due to the prior removal of a considerable amount of the residual organic base in the effluent gas by the sulfurous acid aqueous solution formed from the readily available $SO_2$ obtained from elsewhere in the process. As exemplary, this sulfur dioxide-containing gas supplied into the sulfurous acid sulfate scrubbing zone can be pure or substantially pure $SO_2$ gas bled off the $SO_2$ gas line or conduit leading from a $SO_2$ drying zone, for example from the upper portion of the $SO_2$ drying tower, to a compressor for compressing the $SO_2$ gas for liquefying same, pure or substantially pure $SO_2$ gas drawn off a top $SO_2$ gas-containing portion of a surge tank for liquefied $SO_2$, or pure or substantially pure $SO_2$ bled off the upper $SO_2$ gas-containing portion of a storage tank for liquid $SO_2$, or from a combination of any or all of these sources of $SO_2$ gas. Also as exemplary, this $SO_2$ gas supplied into the sulfurous acid scrubbing zone can be obtained as initially liquid $SO_2$ from a liquefied $SO_2$ surge supply tank or from a liquid $SO_2$ storage tank, and then gasified by passage through an expansion valve or valves or by other suitable means prior to being introduced into this scrubbing zone. The $SO_2$-containing gas supplied into the sulfurous acid scrubbing zone can, if desired, be impure $SO_2$-containing gas bled off the $SO_2$-containing gas mixture supply conduit leading from a blower to the inlet for the $SO_2$-containing gas mixture of the $SO_2$ absorber, although this source of the gas is not preferred.

The passage or supply of sulfur dioxide-containing gas into the sulfurous acid scrubbing zone, which is in addition to the $SO_2$ contained in $SO_2$-impoverished effluent gas passing into this scrubbing zone from the $SO_2$-absorbing zone, constitutes a considerable improvement over the utilization of only the $SO_2$ contained in the $SO_2$-impoverished effluent gas from the absorbing zone for forming the sulfurous acid in the sulfurous acid scrubbing zone. The reason for this is that it is difficult to control the $SO_2$ content of the $SO_2$-impoverished effluent gas from the $SO_2$ absorbing zone, and it is particularly difficult to control the $SO_2$ content of such effluent gas from the absorbing zone if the $SO_2$-containing gas feed stream to the absorber zone has a varying content of $SO_2$.

The sulfur dioxide-containing gas other than the $SO_2$ present in the effluent gas from the $SO_2$ absorbing zone is supplied into the sulfurous acid scrubbing zone in an amount sufficient to result in the formation of an amount of sulfurous acid in aqueous solution therein, due to dissolution of the $SO_2$ gas in and reaction with the water of the liquid aqueous ammonium sulfate and water separately added as such to this scrubbing zone if this is done, which is sufficient to remove a significant portion, which is usually a major portion, i.e more than 50%, or substantially all the organic base, e.g. aromatic amine, from the effluent gas passing into this scrubbing zone from the $SO_2$-absorbing zone. However the amount of sulfur dioxide-containing gas supplied into the sulfurous acid scrubbing zone should be insufficient to result in an excessive, air-polluting amount of sulfur dioxide gas in the tail gas from the subsequent sulfuric acid scrubbing zone. The sulfur dioxide-containing gas, other than the $SO_2$ gas present in the effluent gas from the $SO_2$ absorbing step or zone is usually fed into the sulfurous acid scrubbing zone in amount sufficient to result in the formation of an amount of sulfurous acid therein which is at least equivalent to the content of organic base, e.g. aromatic amine, in the effluent gas passing into this scrubbing zone from the sulfur dioxide absorbing zone. Again, the amount of sulfur dioxide-containing gas fed into the sulfurous acid scrubbing zone should be insufficient to result in an excessive, air-polluting amount of sulfur dioxide gas in the tail gas from the subsequent sulfuric acid scrubber zone.

Any organic base absorbent capable of absorbing sulfur dioxide gas from a gas mixture and which will readily release sulfur dioxide gas upon subsequent treatment, such as, for example, stripping with steam, heating, or subjecting the $SO_2$-pregnant absorbent to reduced pressure, is utilizable herein. The organic base absorbent herein is also characterized by being water-insoluble. By water insoluble as used herein and in the appended claims in referring to the organic base is meant the organic base per se is either insoluble in water or only slightly soluble or of low solubility in water. Exemplary of the organic base absorbents are organic nitrogen-containing base absorbents, for example aromatic amines having the aforementioned capabilities and characteristic, e.g. dimethylaniline, i.e. N, N-dimethylaniline; and xylidine of commerce which is a mixture of isomers of xylidine. The xylidine is utilized herein when mixed with water, such xylidine-water mixture containing the xylidine and water in a volume ratio in the typical volume ratio range of 1:1 to 1:10 respectively. The dimethylaniline is utilizable herein in anhydrous or substantially anhydrous state or as a dimethyl aniline-water mixture.

The sulfur dioxide-containing gas mixture which is treated by the process of this invention for the recovery of the sulfur dioxide is exemplified by sulfur dioxide-containing waste smelter gases, flue gases, and the like. The process herein may be employed for removal of sulfur dioxide from a gas mixture containing any concentration of the sulfur dioxide. However the process herein is especially suitable for removal of sulfur dioxide from a gas mixture containing a relatively small concentration of sulfur dioxide in the range of about 1% to about 10% by volume $SO_2$.

In another embodiment of this invention, the effluent gas from the sulfuric acid scrubbing zone containing a small amount of residual sulfur dioxide and a small amount of residual gaseous organic base absorbent is scrubbed in an alkali metal carbonate scrubbing zone with an alkali metal carbonate liquid solution, e.g. a soda solution, to remove a major portion, i.e. more than 50%, if not substantially all sulfur dioxide from the gas.

The alkali metal carbonate, e.g. soda, i.e. sodium carbonate, effects the removal of residual $SO_2$ from the effluent gas from the sulfuric acid scrubber, in the case of relatively small amount of $SO_2$ present in the gas, by reacting with $SO_2$ to form alkali metal sulfite, e.g. sodium sulfite, in accordance with the following equation:

1. 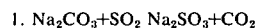 $Na_2CO_3 + SO_2 \rightarrow Na_2SO_3 + CO_2$

The amount of alkali metal carbonate, e.g. soda, added in solution to the alkali metal carbonate scrubbing zone is an amount thereof sufficient to form sodium sulfite in accordance with the foregoing equation (1). The alkali metal carbonate, e.g. soda, usually added in solution to the alkali metal carbonate scrubbing zone is equivalent to the $SO_2$ content of the effluent gas passing into this scrubbing zone from the sulfuric acid scrubbing zone or an excess, usually a small excess, of alkali metal carbonate over this equivalent amount or stoichiometric amount, typically a 5% – 10% by weight excess of the alkali metal carbonate (calculated as $Na_2CO_3$) over such equivalent or stoichiometric amount. When relatively large amounts of residual $SO_2$ are present in the effluent gas from the sulfuric acid scrubber, the alkali metal carbonate, e.g. soda, results in the removal of residual $SO_2$ from the gas by reacting with the $SO_2$ to form alkali metal bisulfite, e.g. sodium bisulfite, in accordance with the equation:

2. $Na_2CO_3 + 2SO_2 + H_2O \rightarrow 2NaHSO_3 + CO_2$

Equation (2) immediately above is not preferred inasmuch as the sodium bisulfite, i.e. $NaHSO_3$, which is formed does not react with dimethylaniline sulfate to release the dimethyl aniline but instead to form dimethylaniline sulfite as well as sodium sulfate as is shown by equation (4) set froth hereinafter. For this reason, it is desired that the sulfur dioxide content of the effluent gas leaving the sulfuric acid scrubbing section and prior to entering the alkali metal carbonate scrubbing section be reduced to less than 0.15% by volume.

The liquid aqueous scrubbing solution ideally containing only alkali metal sulfite, e.g. sodium sulfite, although this solution may contain both alkali metal sulfite and alkali metal bisulfite, with the alkali metal bisulfite, e.g. sodium bisulfite, formed in accordance with equation (2) set forth immediately above when the effluent gas has a relatively large $SO_2$ content, is withdrawn from the alkali metal carbonate scrubbing zone and passed to a collecting zone which is a suitable vessel or tank. Liquid aqueous scrubbing solutions containing organic base-sulfuric acid reaction product and organic base-sulfurous acid reaction product are also withdrawn from respectively the sulfuric acid scrubbing zone and the sulfurous acid scrubbing zone and passed to the same collecting zone. The combined liquid aqueous solutions are passed from the collecting zone to a first stage separating zone, which is a suitable tank or vessel, and introduced beneath the surface of a lower aqueous liquid layer therein having an upper liquid organic layer of liberated organic base superposed thereon. The sodium sulfite reacts with an appreciable portion of the organic base-sulfuric acid reaction product, e.g. dimethylaniline sulfate, in the first stage separating zone and usually also in the collecting zone or tank to effect the release of the dimethylaniline in accordance with the following equation (3). ("DMA" in equation (3) and also in equations (4) and (5) hereafter set forth means the dimethylaniline portion of the molecule or dimethylaniline per se as the case may be):

3. $(DMA)_2SO_4 + Na_2SO_3(aqueous) \rightarrow DMA + DMA.SO_3(aqueous) + Na_2SO_4$ Any sodium bisulfite present reacts with an appreciable portion of the dimethylaniline sulfate to form dimethylaniline sulfite and sodium sulfate in accordance with the following equation:

4. $(DMA)_2SO_4 + 2NaHSO_3(aqueous) \rightarrow 2DMA.SO_3(aqueous) + Na_2SO_4(aqueous)$ Unreacted alkali metal carbonate, e.g. soda, present from the alkali metal carbonate scrubbing zone will also react with a portion of the organic base-sulfuric acid reaction product, e.g. dimethylaniline sulfate, in the first stage separating zone and perhaps also in the collecting zone or tank to release dimethylaniline in accordance with the following equation:

5. $2(DMA)_2SO_4 + 2Na_2CO_3(aqueous) \rightarrow 4DMA + 2Na_2SO_4 + CO_2$

The released organic base, e.g. dimethylaniline, separates as an upper liquid organic layer in the first stage separating zone from a lower aqueous liquid layer containing organic base-sulfurous acid reaction product, e.g. dimethylaniline sulfite, water, and ammonium sulfate, on which the upper organic layer is superposed.

DETAILED DESCRIPTION OF THE DRAWING

Figure 1:
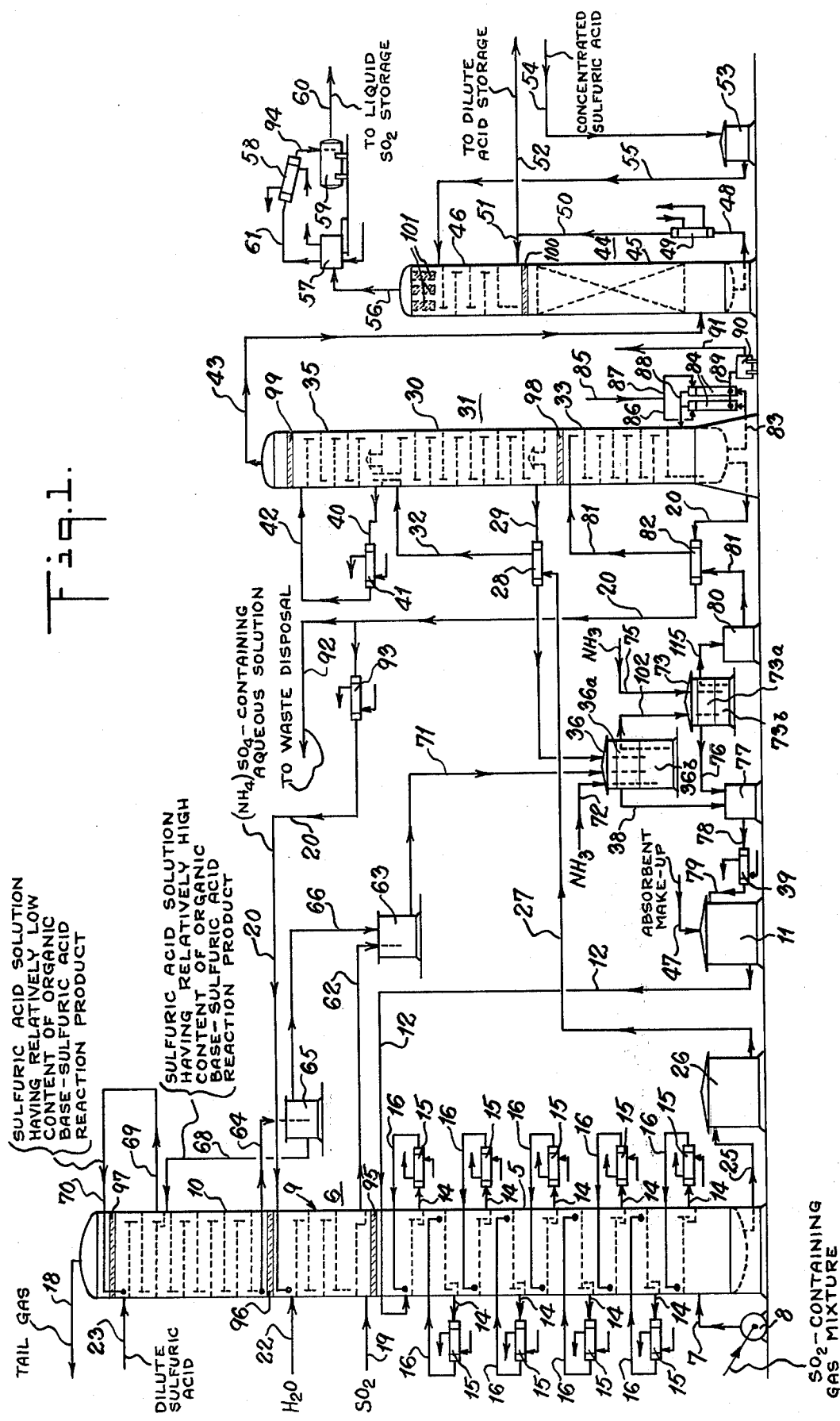
FIG. 1 is a flow sheet of a process of the invention and illustrating diagrammatically, a plant for its practice.

With reference to the flow sheet of FIG. 1, a cool, clean gas mixture containing sulfur dioxide, e.g. a sulfur dioxide-containing gas from a copper smelter containing typically 6% by volume $SO_2$ (dry), is introduced at a temperature of typically 100°F. into the lower portion of absorber section 5 of absorption tower 6 through line 7 by means of blower 8. Tower 6, which also includes sulfurous acid scrubbing section 9 and sulfuric acid scrubbing section 10 in addition to absorber section 5, is, as shown, of the bubble plate type and is equipped with bubble cap trays. The sulfur dioxide-containing gas mixture passes upwardly within absorber section 5 in countercurrent flow to liquid organic base, for example an aromatic amine, e.g. dimethylaniline, supplied to the upper portion of absorber section 5 at a temperature of typically 80°F. from absorbent surge supply tank 11 through line 12. The uprising sulfur dioxide-containing gas bubbles through a descending current of cool, anhydrous or substantially anhydrous, dimethylaniline which flows downwardly from tray to tray in absorber 5, and consequently the sulfur dioxide is transferred from the gas mixture to the dimethylaniline absorbent. Inasmuch as the absorption of the sulfur dioxide in the dimethylaniline is exothermic and considerable heat is evolved during the absorption, the absorber section 5 is provided with cooling means in order to remove the reaction heat or heat of solution and thereby (1) increase the capacity of the dimethylaniline absorbent to absorb sulfur dioxide, and (2) reduce the vapor pressure of the dimethyl aniline, thus saving reagents for the subsequent recovery of the dimethyl aniline absorbent. The dimethylaniline absorbent at an elevated temperature is removed from each tray in the absorber 5 through conduit 14 and passed to cooler 15, cooled in each cooler 15 to a temperature of typically about 72°F. by indirect heat exchange with a cooling fluid, ordinarily water, and returned to the same tray via conduit 16. The absorber section 5 is thereby cooled and the temperature of the dimethylaniline absorbent therein is maintained at typically about 75°F. in the upper portion of absorber section 5 to about 100°F. in the lower portion thereof.

The effluent gas from absorber section 5 is impoverished in sulfur dioxide and enriched in gaseous dimethylaniline and passes sequentially through sulfurous acid scrubbing section 9 and sulfuric acid scrubbing section 10 and leaves scrubbing section 10 through line 18 very low in sulfur dioxide content and free or substantially free of absorbent. In sulfurous acid scrubbing section 9 sulfur dioxide gas and liquid aqueous ammonium sulfate solution withdrawn from the bottom of the regenerator are separately fed into the lower and upper portion respectively of scrubber section 9 beneath the lowermost tray and above the uppermost tray respectively through lines 19 and 20 respectively. Liquid water per se may be supplied in the upper portion of the sulfurous acid-ammonium sulfate scrubbing section 9 through line 22 for the sulfurous acid production in the event additional water is needed to supplement the water introduced into this scrubbing section in the aqueous ammonium sulfate solution, and to maintain the water balance in the process. The uprising sulfur dioxide gas is dissolved in the water of the descending current of aqueous ammonium sulfate solution to form a dilute aqueous solution of sulfurous acid and ammonium sulfate which flows downwardly from tray to tray in scrubber section 9. The presence of the ammonium sulfate in sulfurous acid scrubbing section 9 results in a considerably enhanced dissolution of the $SO_2$ gas in the water to form sulfurous acid as is previously disclosed herein. The uprising effluent gas bubbles through the descending current of thus-formed dilute sulfurous acid-and ammonium sulfate-containing solution which flows downwardly from tray to tray in scrubber 9, and a major portion, i.e. more than 50%, and typically more than 90%, of the gaseous dimethylaniline present in the gas is removed from the gas in scrubbing section 9 by reaction with the sulfurous acid in the presence of the ammonium sulfate to form dimethylaniline sulfite. The aqueous sulfurous acid-and ammonium sulfate-containing scrubbing solution also containing the thus-formed dimethylaniline sulfite is withdrawn from the lower portion of scrubbing section 9 through line 62 and passed to collection tank 63.

The uprising effluent gas leaves the sulfurous acid scrubbing section 9 still containing a small amount of residual gaseous dimethylaniline as well as a small amount of sulfur dioxide gas, and enters and passes upwardly within sulfuric acid scrubbing section 10, wherein the gas is bubbled through a descending current of dilute sulfuric acid aqueous solution typically of 10% sulfuric acid concentration which is introduced into the upper portion of sulfuric acid scrubber 10 above the uppermost tray therein through conduit 23. All or substantially all of the residual gaseous dimethylaniline is removed from the sulfur dioxide-impoverished gas in scrubbing section 10 by reaction with the sulfuric acid to form dimethylaniline sulfate. The tail gas exits from sulfuric acid scrubber 10 via line 18 and typically contains less than 0.10% by volume sulfur dioxide. Dilute liquid aqueous sulfuric acid solution containing the thus-formed dimethylaniline sulfate is removed from the lowermost tray in scrubbing section 10 and passed through line 64 to recycle tank 65.

A substantial portion of the dilute liquid sulfuric acid solution containing a relatively high concentration of the thus-formed organic base sulfate, for example aromatic amine sulfate, e.g. dimethylaniline sulfate, which is removed from the lower portion of the upright or vertically elongated scrubbing zone or section 10 and from the lowermost tray in scrubbing section 10 as shown, and usually a major portion, i.e. more than 50%, of such withdrawn solution, is recycled through line 68 and introduced at a temperature of typically 80°F. into an intermediate or upper portion of scrubbing zone or section 10, and preferably onto the fourth bubble cap tray from the top. This withdrawn acid solution can be recycled and introduced onto the third bubble cap tray from the top, if desired. Dilute liquid sulfuric acid solution containing a relatively low concentration of the thus-formed organic base sulfate, for example aromatic amine sulfate, e.g. dimethylaniline sulfate, is withdrawn from an intermediate or upper portion of the scrubbing zone or section 10 through line 69 and with the point of withdrawal thereof being spaced above and adjacent to the point of introduction of the first-mentioned solution recycled from the lower portion of the scrubbing zone but a sufficient distance thereabove so as to be non-interfering with the introduction of this recycled solution thereinto, and withdrawn from the second or third tray from the top, preferably the third tray from the top, in the embodiment of the flow sheet of FIG. 1 and this withdrawn solution is recycled at a temperature of typically 80°F. through line 70 and introduced into the upper portion of this scrubbing zone or section 10 and onto the uppermost tray. Consequently, in the top portion of scrubbing zone or tower section 10 the liquid aqueous sulfuric acid solution contains only a relatively small amount of organic base, e.g. aromatic amine, whereas the liquid aqueous sulfuric acid solution at the bottom of the scrubbing zone or section 10 contains a relatively large amount and indeed the greatest amount of aromatic amine in this scrubbing zone. This enables the best operation of sulfuric acid scrubbing zone or section 10, with the tail gas leaving the top portion of scrubbing section 10 through line 18 being free or substantially free of gaseous nitrogen base absorbent, e.g. aromatic amine absorbent, as well as being of low $SO_2$ content. At the same time the topmost two or three trays in scrubbing section 10 as well as all remaining trays in section 10 contain entirely adequate quantities of liquid dilute sulfuric acid scrubbing solution for scrubbing the gas.

The sulfur dioxide-pregnant dimethyl aniline is withdrawn from the lower portion of absorber section 5 below the lowermost tray therein and passed through conduit 25 at a temperature of typically about 100°F. and passed to surge tank 26. From surge tank 26, the sulfur dioxide-pregnant dimethylaniline is passed through conduit 27 to heat exchanger 28 wherein it is preheated by indirect heat exchange with a liquid water-dimethylaniline mixture supplied at an elevated temperature of typically 217°F. to heat exchanger 28 from the bottom portion of stripping section 30 via line 29, after which the sulfur dioxide-pregnant dimethylaniline is introduced at an elevated temperature of typically 176°F. into the upper portion of stripping section 30 of tower 31 through line 32. Tower 31 is, as shown, of the bubble plate type and equipped with bubble cap trays. The descending pregnant liquid dimethylaniline passes in intimate countercurrent contact in stripping section 30 with a considerable quantity of uprising steam and also with gaseous dimethylaniline and $SO_2$ supplied from regenerator section 33 whereby the sulfur dioxide is stripped from the dimethylaniline. The stripped or liberated sulfur dioxide gas passes upwardly together with a small amount of residual dimethylaniline vapor and also steam into rectifying section 35. Most of the steam is condensed in stripper 30 due to giving up its heat in stripping the sulfur dioxide from the dimethylaniline. The stripped liquid dimethylaniline and condensed steam, i.e. water, are withdrawn from the lower portion of stripping section 30 through line 29 and passed at an elevated temperature of typically 217°F. to heat exchanger 28 wherein the hot liquid dimethylaniline-water mixture preheats the pregnant dimethylaniline feed to the stripper by indirect heat exchange, and is cooled in so doing. The liquid dimethylaniline-water mixture is then passed to first stage separating tank 36 through line 37 wherein it stratifies or separates by gravity separation into an upper layer 36a of liquid dimethylaniline and a lower liquid water or aqueous layer 36b. Liquid anhydrous or substantially anhydrous dimethylaniline is withdrawn from the upper layer in separating tank 36 through line 38 and passed via line 38, collection tank 77, and line 78 to dimethylaniline supply surge tank 11 where it is ready for use in another cycle. Prior to being introduced into tank 11 the dimethylaniline at an elevated temperature of typically 126°F. is indirectly cooled in cooler 39 with a suitable cooling fluid, for instance cooling water. Liquid anhydrous or substantially anhydrous dimethylaniline is added as make up to surge supply tank 11 through line 47.

All or substantially all of the residual gaseous dimethylaniline is removed from the uprising gaseous mixture comprising gaseous dimethylaniline, sulfur dioxide gas and steam in rectifying section 35 by absorption in downwardly flowing aqueous concentrated sulfurous acid solution, the sulfurous acid solution being formed in rectifying section 35 due to the condensation of most if not all of the steam and the dissolution of a small amount of the sulfur dioxide gas in the resulting liquid water. The gaseous dimethylaniline reacts with the sulfurous acid of the dilute liquid aqueous sulfurous acid solution in rectifying section 35 to form dimethylaniline sulfite. Liquid aqueous solution containing sulfurous acid and dimethylaniline sulfite is withdrawn at an elevated temperature of typically 155°F. from a lower portion of rectifying section 35 through line 40 and, after being indirectly cooled in cooler 41, with a cooling fluid, ordinarily water, is recycled and introduced into the upper portion of rectifying section 35 through line 42.

Sulfur dioxide gas is withdrawn from the top portion of rectifying section 35 through line 43 and introduced into the lower portion of two stage drying tower 44. The upper or second drying stage 46 of tower 44 is, as shown, of the bubble plate type and equipped with bubble cap trays. The lower or first drying stage 45 of tower 44 is, as shown, packed with suitable gas-liquid contact material such as Berl saddles. The water-containing sulfur dioxide gas passes upwardly in packed first drying stage 45 packed with the Berl saddles in intimate contact with a moderate strength liquid sulfuric acid solution, typically sulfuric acid solution of 75% sulfuric acid concentration as supplied to the first drying stage 45, whereby most of the water vapor is removed from the gas. From first stage 45 the sulfur dioxide gas containing a small amount of residual water vapor passes upwardly into second drying stage 46 equipped with bubble cap trays wherein the uprising gas passes in intimate countercurrent contact with liquid concentrated sulfuric acid, typically sulfuric acid of 98% sulfuric acid concentration as supplied to the second drying stage 46, whereby all or substantially all of the water vapor is removed from the gas. Sulfuric acid solution at an elevated temperature of typically 100°F. is withdrawn from the bottom portion of tower 44 through line 48 and, after being indirectly cooled in cooler 49 with a suitable cooling fluid, ordinarily cooling water, is recycled and introduced into the upper portion of first drying stage 45 through lines 50 and 51. A portion of this sulfuric acid solution is withdrawn through line 52 from that being recycled to first drying stage 45 and passed to dilute acid storage. Concentrated liquid sulfuric acid is supplied from a suitable source of the concentrated acid, for instance a sulfuric acid plant, to feed tank 53 through line 54, and from tank 53 the concentrated liquid acid is passed into the upper portion of second drying stage 46 in tower 44 through line 55.

The dry $SO_2$ gas is withdrawn from the top portion of tower 44 through line 56 and, after being compressed in compressor 57, is passed to condenser 58 through line 61. The compressed sulfur dioxide at an elevated temperature is cooled to a sufficiently low temperature in condenser 58, by indirect cooling with a suitable cooling fluid, ordinarily cooling water, to liquefy the sulfur dioxide gas. The liquefied sulfur dioxide is passed from condenser 58 through line 94 to surge tank 59 and thence through line 60 to liquid $SO_2$ storage.

Liquid aqueous solution containing dimethylaniline sulfite and sulfurous acid is withdrawn from the lower portion of scrubber section 9 through line 62 and passed through line 62 to collection tank 63. Liquid aqueous solution containing dimethylaniline sulfate is withdrawn from the lower portion of scrubbing section 10 through line 64 and passed to tank 65 and thence to collection tank 63 through line 66. A portion of the liquid aqueous solution in tank 65 is recycled onto the fourth bubble tray, as shown, of scrubbing section 10 through line 68. The combined liquid aqueous solutions containing dimethylaniline sulfate, dimethylaniline sulfite, and sulfurous acid are withdrawn from collection tank 63 and passed into first stage separating tank 36 through line 71.

Ammonia gas is supplied into first stage separating tank 36, which is a closed tank, through line 72 while avoiding supply of any calcium compound into tank 36 or anywhere else in the system. The ammonia gas is bubbled as sole added treating agent beneath the surface of the lower layer 36b of aqueous liquid solution in first stage separator 36. The quantity of ammonia introduced into first stage separator 36 is an amount sufficient to react with a portion of the dimethylaniline sulfate, for example a major portion, i.e. more than 50%, of the dimethylaniline sulfate in separator 36 to release dimethylaniline and form ammonium sulfate therein but insufficient to react with all of the dimethylaniline sulfate in separator 36. The liberated dimethylaniline passes by gravity separation to the upper layer 36a in separator 36 from where anhydrous or substantially anhydrous dimethylaniline is withdrawn through line 38 and ultimately returned to the sulfur dioxide-absorbing step in absorber section 5 of tower 6 as is previously disclosed herein. Aqueous liquid containing dimethylaniline sulfite, ammonium sulfate and a small amount of residual dimethylaniline sulfate is withdrawn from lower aqueous layer 36b in first stage separating tank 36 through line 102, passed to second stage separating tank 73, and introduced into second stage separator 73 beneath the level of the lower layer of aqueous solution therein. Ammonia gas is supplied into second stage separating tank 73 through line 75 while avoiding supply of any calcium compound into tank 73. The ammonia gas is bubbled as sole added treating agent beneath the surface of the lower layer of aqueous solution therein. The quantity of ammonia introduced into second stage separating tank 73, which is a closed tank, is an amount thereof sufficient to release or liberate the dimethylaniline from all remaining dimethylaniline sulfate in the aqueous liquid in separator 73. The ammonia reacts with the dimethylaniline sulfate in separating tank 73 to release all or substantially all dimethylaniline therefrom and also to form ammonium sulfate. The liberated dimethylaniline passes by gravity separation to the upper layer 73a in separator 73 from where anhydrous or substantially anhydrous dimethylaniline is withdrawn through line 76 and passed to separated dimethylaniline collecting tank 77. This dimethylaniline is combined in tank 77 with dimethylaniline withdrawn from the upper layer thereof in first stage separator tank 36, and the combined liquid dimethylaniline is withdrawn from tank 77 through line 78 and returned, after indirect cooling in cooler 39, to scrubber section 5 of tower 6 via line 105, surge tank 11 and line 12. Liquid aqueous solution containing dimethylaniline sulfite and ammonium sulfate is withdrawn from the lower layer 73b thereof in second stage separating tank 73 through line 105 and passed to regenerator feed tank 80. Such liquid aqueous solution is withdrawn from tank 80 through line 81 and, after being preheated in heat exchanger 82 by indirect heat exchange with ammonium sulfate-containing aqueous solution at elevated temperature of typically 221°F. being passed to scrubbing section 9 of tower 6 through line 20, is introduced through line 81 into the upper portion of regenerator section 33 of tower 31 above the uppermost tray therein. This liquid aqueous solution is heated to its boiling point at the prevailing pressure by being withdrawn from the lower portion of regenerator section 33 through line 83 and passed to regenerator heaters 84, wherein the solution is heated by indirect heat exchange with steam or other suitable heating fluid introduced through lines 85, 86 and 87, after which it is re-introduced into the lower portion of regenerator section 33 below the lowermost tray therein through line 88. Due to the solution having been heated to its boiling point at the prevailing pressure in heaters 84, the dimethylaniline sulfite is decomposed in regenerator section 33 to liberate gaseous dimethylaniline and sulfur dioxide gas, and a considerable quantity of process steam is generated. The resulting gaseous dimethylaniline, sulfur dioxide gas and steam pass upwardly in regenerator section 33 and into stripping section 30 wherein the steam and gaseous dimethylaniline pass into direct contact with the pregnant liquid dimethylaniline to strip sulfur dioxide from the dimethylaniline. Cooled and condensed steam is withdrawn from the lower portion of heaters 84 through line 89 and passed to condensate receiver tank 90 wherein the water condensate is collected, the water condensate being withdrawn from receiver 90 and returned for steam generation or other use through line 91.

Liquid aqueous solution containing ammonium sulfate is withdrawn at elevated temperature of typically 221°F. from the lower portion of regenerator section 33 through line 20 and, after being used to preheat liquid aqueous solution containing dimethylaniline sulfite and ammonium sulfate flowing in line 81 by indirect heat exchange in heat exchanger 82, whereby this ammonium sulfate-containing aqueous solution is cooled, is passed without any treatment thereof except for cooling into the upper portion of sulfurous acid scrubbing section 9 through line 20 as is previously disclosed herein. A minor portion or small amount of liquid aqueous solution containing ammonium sulfate is bled off the main stream thereof through line 92 and passed to waste disposal. The ammonium sulfate-containing aqueous solution is cooled indirectly in cooler 93 with a suitable cooling fluid, usually water, prior to being introduced into scrubbing section 9.

The absorption tower 6, as shown, consists of single bubble-plate column which is divided into three separate units or sections. The $SO_2$-absorber section 5, which is the bottom section, consists of nine bubble cap trays as shown. The sulfurous acid scrubbing section 9, located directly above absorber section 5, consists of five bubble cap trays as shown. The sulfuric acid scrubbing section 10, which is the top section and located directly above scrubbing section 9, consists of 10 bubble cap trays as shown. Each of the three sections in absorption tower 6, is separate and distinct in operation and is provided with independent inlets and outlets for the liquid flow. The stripping tower 31, as shown, also consists of a single bubble plate tower and is divided into three units or sections. The regenerator section 33, which is the bottom section, consists of seven bubble cap trays as shown. The stripping section 30, which is located directly above the regenerator section, consists of ten-bubble cap trays as shown. The rectifying section 35, which is the top section and located directly above the stripping section, consists of five-bubble cap trays as shown. The drying tower 44, as shown, also consists of a single tower which is divided into two units, sections or stages. The first drying section or stage 45, which is the bottom section, is packed with a suitable gas-liquid contact material which was Berl saddles. The second drying section or stage 46 located directly above first drying stage 45, consists of five bubble cap trays as shown. Mist eliminators 95, 96 and 97 are provided in tower 6, mist eliminators 98 and 99 in tower 31, and mist eliminators 100 and 101 in tower 44.

The improvements and advantages of this invention can be attained, at least in part, in processes varying in certain respects from the flow sheet shown in the accompanying drawing. Thus, the $SO_2$ absorber section 5, sulfurous acid scrubbing section 9 and sulfuric acid scrubbing section 10 of tower 6 can be separate columns or towers. The regenerator section 33 of tower 31 can also be a separate column or tower and the stripping section and rectifying section of tower 31 a separate column or tower. Moreover the two drying stages 45 and 46 of $SO_2$ drying tower 44 can be separate columns or towers.

Any suitable gas-liquid contacting means or material can be utilized in towers 6, 31, and 44 of the process of the flow sheet of the accompanying drawing. The bubble cap trays utilized in $SO_2$ absorption section 5, and sulfurous acid and sulfuric acid scrubbing sections 9 and 10 respectively of tower 6, in regenerator, stripping and rectifier sections 33, 30 and 35 respectively of tower 31, and drying stage 46 of tower 44, the Berl saddles utilized in drying stage 45 of tower 44 and the bubble cap trays utilized in alkali metal carbonate scrubbing section 104 of tower 6 in the modification shown in the FIG. 2 flow sheet, are preferred for the gas-liquid contacting, but valve trays, Raschig rings, Intalox saddles or other suitable gas-liquid contact means are utilizable.

Figure 2:
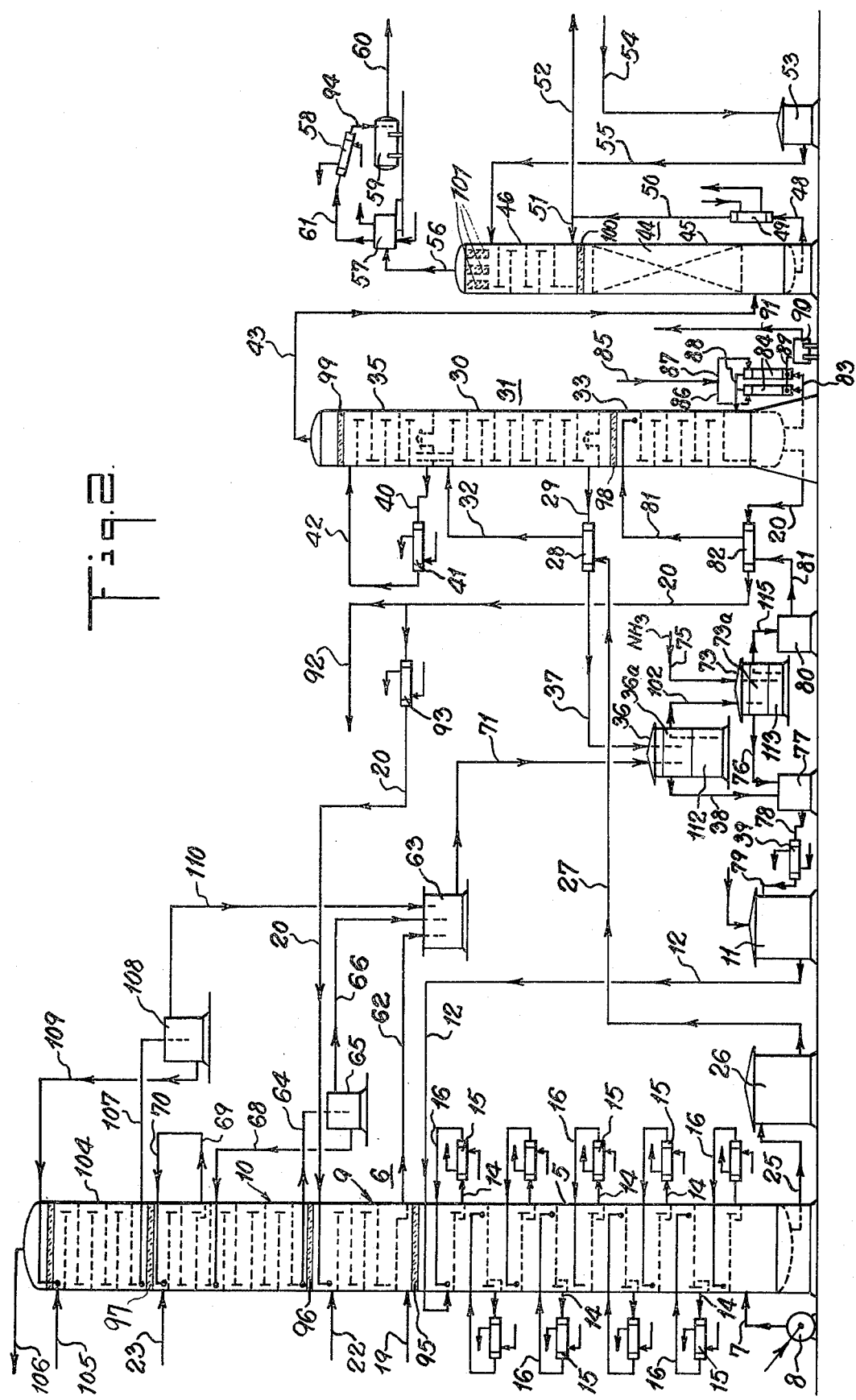
FIG. 2 is a flow sheet of a modification of the process of the invention and illustrating diagrammatically a plant for its practice.

Referring to the flow sheet of FIG. 2, in accordance with a modification of the process herein, the process is the same or substantially the same as that previously described herein with reference to FIG. 1 up to the point where the tail gas exits from the sulfuric acid scrubber 10 except that in the sulfurous acid scrubbing section 9 the uprising sulfur dioxide-containing effluent gas bubbles through a descending current of thus-formed dilute sulfurous acid and ammonium sulfate-containing aqueous solution which also contains alkali metal sulfate, e.g. sodium sulfate. From sulfuric acid scrubber 10, the tail gas or effluent gas passes upwardly through alkali metal carbonate scrubbing section 104. This effluent gas ordinarily still contains a small amount, less than 0.10% by volume, sulfur dioxide and typically about 0.07% – 0.08% by volume sulfur dioxide. Such effluent gas is bubbled through a descending current of dilute alkali metal carbonate aqueous solution, preferably dilute sodium carbonate aqueous solution, of typical alkali metal carbonate concentration of about 5.0% – 10.0%, which is introduced into the upper portion of alkali metal carbonate scrubbing section 104 above the uppermost tray therein through conduit 105. A major portion, i.e. more than 50%, of the residual sulfur dioxide, or substantially all of the sulfur dioxide is removed from the gas in scrubbing section 104 by reaction with the alkali metal carbonate, e.g. sodium carbonate, to form sodium sulfite and/or sodium bisulfite as is previously disclosed herein. The tail gas exits from alkali metal carbonate scrubber 104 through line 106 and typically contains less than 0.05%, for instance about 0.035% – 0.04%, by volume sulfur dioxide. Dilute liquid aqueous sodium carbonate solution containing the thus-formed sodium sulfite is withdrawn from the lowermost tray in scrubbing section 104 and passed through line 107 to recycle tank 108. A substantial portion of the dilute alkali metal carbonate solution in tank 108 is recycled through line 109 and introduced into the upper portion of scrubbing section 104 above the uppermost tray therein. The amount of dilute alkali metal carbonate solution recycled into the upper portion of scrubbing section 104 from recycle tank 108 can be less than a major portion, i.e. less than 50%, or a major portion, i.e. more than 50%, of the dilute alkali metal carbonate solution withdrawn through line 107 with the amount of this dilute alkali metal carbonate solution recycled not being especially critical so long as the amount of such recycled alkali metal carbonate solution together with or notwithstanding the amount of dilute alkali metal carbonate aqueous solution introduced through line 105 is sufficient to fill all trays in scrubbing section 104 completely or substantially completely and maintain such trays completely or substantially completely filled with the liquid dilute alkali metal carbonate solution.

Liquid dilute aqueous solution containing alkali metal carbonate, e.g. sodium carbonate, and alkali metal sulfite, e.g. sodium sulfite, is withdrawn from recycle tank 108 through line 110 and passed to collection tank 63. The combined liquid aqueous solutions or solution containing dimethylaniline sulfate, dimethylaniline sulfite, sulfurous acid, alkali metal carbonate, e.g. sodium carbonate, and alkali metal sulfite, e.g. sodium sulfite, are withdrawn from collection tank 63 and passed into first stage separating tank 36 through line 71. In this embodiment of FIG. 2, ammonia is not supplied into the first stage separating tank 36 whereas ammonia is supplied into the first stage separating tank in the embodiment of FIG. 1. The sodium sulfite reacts with a major portion, i.e. more than 50%, of the dimethylaniline sulfate in the collecting tank or zone 63, and usually also to a lesser extent in first stage separating tank 36 to result in release of dimethylaniline from such dimethylaniline sulfate and the formation of sodium sulfate and dimethylaniline sulfite in accordance with equation (3) previously set forth herein. Sodium bisulfite, if present, reacts with the dimethylaniline sulfate to form dimethylaniline sulfite and sodium sulfate in accordance with the equation (4) previously set forth herein, and does not result in the release of the dimethylaniline from the aqueous solution. Alkali metal carbonate, e.g. sodium carbonate, ordinarily present in collection tank or zone 63, reacts with the dimethylaniline sulfate in the collection tank or zone 63 and perhaps also to a limited extent in the first stage separating tank 36 to result in the release of the dimethylaniline and the formation of sodium sulfate and carbon dioxide in accordance with the equation (5) previously set forth herein. If desired, alkali metal carbonate, e.g. sodium carbonate, can be added to the lower layer of aqueous liquid solution in first stage separating tank 36 through line 111 but this is not preferred for the reason that considerable amounts of $CO_2$ gas is evolved during the release of the dimethylaniline from the dimethylaniline sulfate by its reaction with sodium carbonate, and this evolved $CO_2$ gas would require special venting of the first stage separating tank 36.

The released dimethylaniline separates in first stage separating tank 36 as an upper liquid organic layer thereof 36a which is superposed on a lower aqueous solution layer 112 comprising the alkali metal sulfate e.g. sodium sulfate, dimethylaniline sulfite, ammonium sulfate and usually also a small amount of residual dimethylaniline sulfate. Liquid dimethylaniline is withdrawn from the upper layer thereof in separating tank 36 and ultimately returned to $SO_2$ absorption section 5 of tower 6 via line 38, separated absorbent tank 77, line 78, cooler 39, surge tank 11 and line 12. Liquid aqueous solution comprising the alkali metal sulfate, dimethylaniline sulfite, ammonium sulfate and usually also a small amount of residual dimethylaniline sulfate is withdrawn from the lower aqueous solution layer in first stage separating tank 36 through line 102 and passed to second stage separating tank 73. Ammonia is added to the aqueous solution in separating tank 73 through line 75, with the ammonia being introduced beneath the surface of this aqueous solution, such aqueous solution being the lower layer 113 in separating tank 73. The amount of ammonia introduced into second stage separating tank 73 is an amount thereof sufficient to release or liberate the organic base, for example aromatic amine, e.g. dimethylaniline, from all remaining organic base-sulfuric acid reaction product, for example aromatic amine-sulfuric acid reaction product, e.g. dimethylaniline sulfate in zone or tank 73. The ammonia reacts with the residual dimethylaniline sulfate in tank 73 to release the dimethylaniline from the dimethylaniline sulfate, the released dimethylaniline separating as an upper organic liquid layer 73a in separating tank 73 on the lower aqueous solution layer 113 comprising the alkali metal sulfate, dimethylaniline sulfite and ammonium sulfate. Liquid dimethylaniline is withdrawn from the upper layer 73a in second stage separating tank 73 and ultimately returned to $SO_2$ absorption section 5 of tower 6 via line 76, tank 77, line 78, cooler 39, line 79, surge tank 11 and line 12. Liquid aqueous solution containing the alkali metal sulfate, dimethylaniline sulfite, and ammonium sulfate is withdrawn from the lower aqueous solution layer 113 in second stage separating tank 73 through line 79 and passed via regenerator feed tank 80, heat exchanger 82 and line 81 to regenerator section 33 of tower 31 and introduced therein above the uppermost tray in section 33. The remainder of this process in accordance with the modification shown in the FIG. 2 flow sheet is the same or substantially the same as that previously described herein with reference to FIG. 1 except that the liquid aqueous solution which is withdrawn at elevated temperature of typically 221°F. from the lower portion of regenerator section 33 of tower 31 through line 20 and is passed ultimately into the upper portion of sulfurous acid scrubbing section 9 of tower 6 via heat exchanger 82, cooler 93 and line 20 contains alkali metal sulfate, e.g. sodium sulfate, in addition to ammonium sulfate. A minor portion or small amount of this liquid aqueous solution containing ammonium sulfate and sodium sulfate is bled off the main stream thereof through line 92 and passed to waste disposal, and the aqueous solution introduced into the upper portion of sulfurous acid scrubbing section 9 of tower 6 through line 20 contains typically about 4.0% – 6.0% by weight of sodium sulfate and about 1.0% – 1.5% by weight of ammonium sulfate.

In this embodiment in accordance with the FIG. 2 flow sheet, the alkali metal carbonate scrubbing section 10 of tower 6, which is the top section, consists of 6 bubble cap trays as shown. The scrubbing section 104 is separate and distinct in operation from the absorber section 5, the sulfurous acid scrubbing section 9, and the sulfuric acid scrubbing section 10, and scrubbing section 10 is provided with independent inlets and outlets for the liquid flow. If desired, the alkali metal carbonate scrubbing section can be a separate column or tower.

It will be understood that the systems shown in the flow sheets of the accompanying FIG.'s 1 and 2 are provided with the required pumps, valves, meters, etc.

DESCRIPTION OF THE PREFERRED EMBODIMENTS

Preferably a major portion in the range of about 65% to about 90% by volume of the liquid aqueous ammonium sulfate-containing solution withdrawn from the regenerator zone, is passed to the sulfurous acid scrubbing zone in the process in accordance with both the FIG. 1 and FIG. 2 flow sheets.

The total amount of ammonia added to the combined aqueous solutions in the separator zone or separator zones in the process in accordance with the FIG. 1 flow sheet for releasing the organic base, e.g. the aromatic amine from the organic base sulfate, e.g. aromatic amine sulfate, is preferably an amount thereof which will result in the waste liquid aqueous solution at the lower portion of the regenerator zone and which is withdrawn from the lower portion of the regenerator zone having a pH of 4 to 5, more preferably 4.5 to 5.0.

The ammonia is preferably added to the combined aqueous solutions or solution containing the organic base-sulfurous acid reaction product and the organic base sulfuric acid reaction product in the separating zone or zones as ammonia gas or gaseous ammonia.

In the process of the invention in accordance with the FIG. 1 flow sheet, preferably the ammonia is added to the combined aqueous solutions containing the organic base-sulfurous acid reaction product and the organic base-sulfuric acid reaction product in two or more stages, more preferably two stages. In accordance with this preferred embodiment the ammonia is added to the combined liquid aqueous solutions in a first stage separating zone in an amount sufficient to result in the liberation of the organic base, e.g. aromatic amine, from a substantial portion, e.g. a major portion, i.e. in excess of 50%, of the total aromatic amine sulfate present in the solutions and the formation of ammonium sulfate in the solution. The liquid liberated aromatic amine separates by gravity separation as an upper layer from the aqueous solution which is a lower layer in the separator zone, and the separated liquid aromatic amine is withdrawn from the first stage separating zone and returned ultimately to the sulfur dioxide absorbing step. Liquid aqueous solution containing the ammonium sulfate, aromatic amine-sulfurous acid reaction product and residual aromatic amine-sulfuric acid reaction product is withdrawn from the separated layer thereof in the first stage separating zone and passed into a second stage separating zone. Ammonia is added to the liquid aqueous solution in the second stage separating zone in an amount sufficient to result in the liberation of all or substantially all aromatic amine from the residual amount of total aromatic amine sulfate contained in the combined aqueous solutions or solution. The liberated liquid aromatic amine is separated by gravity separation as an upper layer in the second stage separator zone, and this separated liquid aromatic amine is withdrawn from the second stage separating zone and returned ultimately, usually after being combined with separated liquid aromatic amine which has been withdrawn from the first stage separating zone, to the sulfur dioxide absorbing step. The liquid aqueous solution containing the ammonium sulfate and aromatic amine-sulfurous acid reaction product separates by gravity separation as a lower layer in the second stage separating zone, and the separated liquid aqueous solution is withdrawn from the second stage separating zone and passed to the regenerator zone.

The $SO_2$-containing gas which is supplied into the sulfurous acid scrubbing zone, and which is in addition to the $SO_2$ contained in $SO_2$-impoverished effluent gas passing into such scrubbing zone from the $SO_2$ absorbing zone, is preferably a pure or substantially pure $SO_2$ gas obtained elsewhere in the process.

The preferred organic base absorbent is the aromatic amines. Preferred among the aromatic amines are dimethylaniline, i.e. N, N-dimethylaniline, and a xylidine-water mixture containing the xylidine and water in a volume ratio in the volume ratio range of 1:5 to 1:10 respectively. The dimethylaniline is preferred for removal of $SO_2$ from a high strength $SO_2$-containing gas mixture containing in excess of 3% to up to about 10% $SO_2$ by volume. The xylidine-water mixture is preferred for removal of $SO_2$ from a lower or weaker strength $SO_2$-containing gas mixture containing about 1% to 3% $SO_2$ by volume.

Preferably the organic base absorbent liquid is withdrawn from each bubble tray in the upright or vertically elongated absorber zone or section of the tower or column, followed by cooling this withdrawn absorbent liquid. The cooled absorbent liquid is then returned to the same bubble tray in the absorber zone.

The sulfur dioxide-containing gas which is supplied into the sulfurous acid upright or vertically elongated scrubbing zone or section of the absorption tower, and which is in addition to the sulfur dioxide gas contained in sulfur dioxide-impoverished effluent gas passing into such scrubbing zone from the $SO_2$-absorbing zone, is preferably introduced into a lower portion of such scrubbing zone and most preferably beneath the lowermost tray or other gas-liquid contact means therein. Such sulfur dioxide-containing gas, which is preferably pure or substantially pure $SO_2$ gas obtained elsewhere in the process, is dissolved in water of the liquid aqueous ammonium sulfate-containing solution in this scrubbing zone to form dilute sulfurous acid aqueous solution. The liquid aqueous ammonium sulfate-containing solution, which is being passed from the regenerator zone, is preferably introduced into the upper portion of this sulfurous acid scrubbing zone above the uppermost tray or other gas-liquid contact means therein.

The processes herein are preferably continuous processes.

The invention is further illustrated by the following examples:

EXAMPLE A

Referring to FIG. 1, a cooled and clean gas mixture containing 6.0% by volume $SO_2$ (dry) and obtained from a copper smelter is introduced at a temperature of 100°F. and a volumetric feed rate of 32,500 SCFM (dry) through line 7 into absorber section 5 of absorption tower 6 below the lowermost tray therein by means of blower 8. Anhydrous liquid dimethylaniline is pumped into the upper portion of absorber section 5 of tower 6 above the uppermost tray therein at a flow rate of 250 g.p.m. and a temperature of 80°F. from absorber surge supply tank 11 through line 12. The liquid dimethylaniline absorbent passing downwardly in absorber section 5 is cooled indirectly by means of coolers 15 supplied with cooling water, and the dimethylaniline absorbent is maintained at a temperature of about 75°F. at the top tray to about 100°F. at the bottom tray in absorber section 5. Sulfur dioxide-pregnant liquid dimethylaniline absorbent is withdrawn at a temperature of about 100°F. from absorber section 5 through line 25 and pumped at a flow rate of 269 g.p.m. and at flow rates of $SO_2$, $SO_4$ and dimethylaniline contained therein of 349.6 lbs/minute, 2.6 lbs/minute and 1963.4 lbs/minute respectively to surge tank 26. From surge tank 26 the pregnant liquid dimethylaniline is pumped through line 27 to heat exchanger 28 wherein it is preheated by indirect heat exchange with a liquid water-dimethylaniline mixture supplied at elevated temperature of typically 217°F. to heat exchanger 28 from stripping section 30 of tower 31 via line 29. The pregnant liquid dimethylaniline is passed from heat exchanger 28 at a temperature of 176°F. through line 32 and introduced into stripping section 30 of tower 31. Sulfur dioxide is stripped from the pregnant liquid dimethylaniline in stripping section 30 and the liberated sulfur dioxide gas passes upwardly into rectifying section 35. Stripped liquid dimethylaniline and water (resulting from the condensation of the steam in stripping the sulfur dioxide from the pregnant dimethylaniline) are withdrawn from the lower portion of stripping section 30 below the lowermost tray therein through line 29 and passed at a temperature of 217°F. and a flow rate of 279 g.p.m. to heat exchanger 28. The hot liquid dimethylaniline-water mixture preheats the pregnant dimethylaniline feed to the stripping section 30 in heat exchanger 28 by indirect heat exchange as aforementioned, and is cooled in so doing. The liquid dimethylaniline-water mixture is then passed at a temperature of 145°F. and a flow rate of 279 g.p.m. through line 37 to first stage separating tank 36 wherein this liquid mixture is introduced beneath the surface of a lower aqueous layer therein. The liquid mixture separates by gravity separation in separating tank 36 into an upper layer 36a of liquid dimethylaniline and a lower water or aqueous layer 36b.

The $SO_2$-lean and dimethylaniline-enriched effluent gas from absorber section 5 of tower 6 which contains about 0.15% by volume $SO_2$ and about 800–900 p.p.m. of gaseous dimethylaniline, passes upwardly sequentially through sulfurous acid scrubbing section 9 and sulfuric acid scrubbing section 10. A tail gas containing 0.05% by volume $SO_2$ and virtually free of gaseous dimethylaniline is withdrawn from sulfuric acid scrubbing section 10 through line 18. Substantially pure $SO_2$ gas bled off the upper $SO_2$ gas-containing space in liquefied $SO_2$ surge tank 59 and aqueous ammonium sulfate solution withdrawn from the lower portion of regenerator section 33 of tower 31 are separately supplied into scrubbing section 9 through lines 19 and 20 respectively. The $SO_2$ gas is supplied into the lower portion of scrubber section 9 below the lowermost tray therein through line 19 at a flow rate of 30 SCFM (dry) and at a temperature of 80°F. The liquid aqueous ammonium sulfate solution is pumped into the upper portion of scrubbing section 9 above the uppermost tray therein through line 20 at a temperature of 80°F. and a flow rate of 26 g.p.m. and at flow rates of ammonium sulfate and water contained therein of 13.0 lbs/minute and 208 lbs/minute respectively. Water is supplied into scrubbing section 9 through line 22 at a flow rate of 6½ g.p.m. The uprising $SO_2$ gas in scrubbing section 9 is dissolved in and reacts with the water of the downwardly flowing aqueous ammonium sulfate to form in scrubbing section 9 a dilute sulfurous acid-and ammonium sulfate-containing aqueous solution. A major portion, i.e. more than 50%, of the gaseous dimethylaniline present in the gas is removed from the gas in scrubbing section 9 by reaction with the sulfurous acid in the presence of the ammonium sulfate to form dimethylaniline sulfite. The aqueous sulfurous acid-and ammonium sulfate-containing scrubbing solution also containing the thus-formed dimethylaniline sulfite is withdrawn from the lowermost tray in scrubber section 9 through line 62 at a temperature of 80°F. and passed at flow rates of $SO_2$, $SO_4$ and dimethylaniline contained therein of 5.0 lbs/minute, 0.6 lb/minute and 8.6 lbs/minute respectively to collection tank 63. The uprising effluent gas leaving scrubbing section 9 contains, by volume, about 60 to 80 p.p.m. of residual gaseous dimethylaniline and about 0.07 – 0.10% $SO_2$, and this gas enters and passes upwardly within sulfuric acid scrubbing section 10. Dilute sulfuric acid aqueous solution of 10% sulfuric acid concentration is supplied at a flow rate of 0.4 g.p.m. and at ambient temperature into the sulfuric acid scrubbing section 10 above the uppermost tray therein. Substantially all of the residual dimethylaniline is removed from the gas in scrubbing section 10 by reaction with the sulfuric acid of the dilute sulfuric acid solution to form dimethylaniline sulfate. Liquid sulfuric acid solution containing a relatively high concentration of dimethylaniline sulfate is withdrawn from the lowermost tray in scrubbing section 10 at a temperature of 80°F. and passed through line 64 at a flow rate of 16.4 g.p.m. and at flow rates of dimethylaniline, $H_2SO_4$ and water contained therein of 41 lbs/minute, 15.6 lbs/minute and 141.2 lbs/minute respectively to recycle tank 65. A major portion of the dilute aqueous sulfuric acid solution containing the dimethylaniline sulfate in tank 65 is withdrawn from a lower portion of tank 65 and pumped at a temperature of 80°F. and at a flow rate of 16 g.p.m. as recycle scrubbing solution through line 68 and introduced into scrubber section 10 onto the fourth tray therein. Liquid sulfuric acid solution containing a relatively low concentration of dimethylaniline sulfate is withdrawn from the third tray from the top of scrubber section 10 and pumped at a temperature of 80°F. and a flow rate of 15 g.p.m. as recycle scrubber solution through lines 69 and 70 and introduced onto the top tray of scrubber section 10.

A gaseous mixture of gaseous dimethylaniline, $SO_2$ gas and steam leaves stripping section 30 of tower 31 and enters and passes upwardly within rectifying section 35. Substantially all dimethylaniline is removed from such gaseous mixture in rectifying section 35 by absorption in dilute aqueous sulfurous acid solution flowing downwardly in rectifying section 35. The sulfurous acid solution is formed in rectifying section 35 due to the dissolution of a minor portion of the $SO_2$ gas in liquid water resulting from condensation of all or virtually all of the steam. The gaseous dimethylaniline reacts with the sulfurous acid in rectifying section 35 to form dimethylaniline sulfite. Liquid aqueous solution containing sulfurous acid and dimethylaniline sulfite is withdrawn from a lower portion of rectifying section 35 at an elevated temperature of 155°F. through line 40 and, after being indirectly cooled in cooler 40 with cooling water, is pumped at a temperature of 75°F. and a flow rate of 335 g.p.m. into the upper portion of rectifying section 35 above the uppermost tray therein through line 42. There also is a net overflow of solution into stripping section 30 equal in volume to steam condensed in rectifying section 35.

$SO_2$ gas at a temperature of 80°F. and containing considerable water vapor is withdrawn from the top portion of tower 31 through line 43 at a flow rate of $SO_2$ and water of 347.7 lbs/minute and 3.5 lbs/minute respectively and passed into the lower portion of two stage drying tower 44. The water-containing gas passes serially upwardly in tower 44 in intimate countercurrent contact with moderate strength aqueous sulfuric acid solution in first packed drying stage 45, and then in intimate countercurrent contact with concentrated sulfuric acid in second drying stage 46 equipped with bubble cap trays. Moderate strength aqueous sulfuric acid solution of about 75% sulfuric acid concentration is supplied at an average temperature of 85°F. and a flow rate of 35 g.p.m. into the upper portion of first drying stage 45 through line 51, such sulfuric acid solution having been withdrawn from the bottom portion of tower 44 through line 48 at a temperature in the range of 85°F. to 100°F., pumped to cooler 49 and, after being indirectly cooled in cooler 49 with cooling water, returned to the upper portion of first drying stage 45 through lines 50 and 51 and introduced therein as is previously disclosed herein. A portion of the 75% concentration sulfuric acid solution is bled from the circulating system through line 52. Concentrated sulfuric acid of 98% concentration is pumped through line 55 into second drying stage 46 of tower 44 above the uppermost tray therein from acid feed tank 53. The concentrated acid is supplied to feed tank 53 through line 54 from an acid supply source. Substantially anhydrous $SO_2$ gas is withdrawn from the top portion of drying tower 44 through line 56 at a temperature of 85°F. and passed at a flow rate of 347.7 lbs/minute and under a pressure of 14.7 psia to compressor 57 wherein the $SO_2$ gas is compressed. The compressed $SO_2$ gas leaves the compressor 57 through line 61 at a temperature of 320°F. and under a pressure of 84.1 psia and is passed to condenser 58 wherein the $SO_2$ gas is cooled to a sufficiently low temperature to liquefy same. The liquefied $SO_2$ is passed from condenser 58 at a temperature of 100°F. and under a pressure of 84.1 psia through line 94 to liquefied $SO_2$ surge tank 59. From surge tank 59 the liquid $SO_2$ is pumped to liquid $SO_2$ storage.

The combined liquid aqueous scrubbing solutions containing dimethylaniline sulfate, dimethylaniline sulfite, sulfuric acid and sulfurous acid are withdrawn from collection tank 63 at a temperature of 80°F. and pumped through line 69 at a flow rate of 35.2 g.p.m. and at flow rates of $SO_2$, $SO_4$ and dimethylaniline contained therein of 5.0 lbs/minute, 0.6 lb/minute, and 9.6 lbs/minute respectively to first stage separating tank 36 and introduced beneath the surface of lower aqueous liquid layer 36b therein. $NH_3$ gas is supplied into separating tank 36 through line 71 at a volumetric flow rate of 23 SCFM (dry), and the $NH_3$ gas is introduced beneath the surface of the lower layer 36b of liquid aqueous solution in separating tank 36. The ammonia reacts with a major portion of the dimethylaniline sulfate and water in separator 36 to liberate dimethylaniline and to form ammonium sulfate. The liberated dimethylaniline passes by gravity separation to the upper layer 36a of liquid dimethylaniline in separating tank 36, from where anhydrous or substantially anhydrous dimethylaniline is withdrawn through line 38 and passed at a temperature of 126°F. and a flow rate of 247 g.p.m. to tank 77. This anhydrous liquid dimethylaniline is combined in tank 77 with anhydrous or substantially anhydrous liquid dimethylaniline withdrawn from the upper layer 73a thereof in second stage separating tank 73 and the combined anhydrous liquid dimethylaniline at a temperature of 126°F. is pumped from tank 78 to cooler 39, and, after being indirectly cooled in cooler 39 with cooling water, is introduced at a temperature of 80°F. into surge supply tank 11 through line 78. The anhydrous liquid dimethylaniline is pumped from surge tank 11 through line 12 into the upper portion of absorber section 5 of tower 6 as is hereinbefore disclosed. Aqueous liquid containing dimethylaniline sulfite, ammonium sulfate and residual dimethylaniline sulfate is withdrawn from the lower aqueous layer 36b in first stage separating tank 36 and passed at a temperature of 126°F. and a flow rate of 66 g.p.m. and flow rates of $SO_2$, $SO_4$ and dimethylaniline of 5.5 lbs/minute, 0.5 lb/minute and 20 lbs/minute respectively through line 72 to second stage separating tank 73 wherein this aqueous liquid is introduced beneath the surface of the lower layer 73b of aqueous liquid therein. $NH_3$ gas is supplied into second stage separating tank 73 through line 75 at a volumetric flow rate of 4 SCFM (dry) and introduced beneath the surface of the lower layer 73b of aqueous liquid therein. Such amount of $NH_3$ gas supplied into separator 73 is sufficient to release the dimethylaniline from all dimethylaniline sulfate present in the aqueous liquid in separating tank 73. The ammonia reacts with the dimethylaniline sulfate in separating tank 73 to release substantially all dimethylaniline therefrom and to form ammonium sulfate. The liberated dimethylaniline passes by gravity separation to the upper layer 73a in separator 73. Anhydrous or substantially anhydrous liquid dimethylaniline is withdrawn from the upper layer thereon in separating tank 73 through line 76 at a temperature of 126°F. and passed at a flow rate of 0.3 g.p.m. to separated dimethylaniline tank 77.

Liquid aqueous solution containing dimethylaniline sulfite and ammonium sulfate is withdrawn from the lower aqueous solution layer 73b in separator 73 through line 79 at a temperature of 126°F. and passed at a flow rate of 65.7 g.p.m. and at flow rates of $SO_2$, ammonium sulfate, water, and dimethylaniline contained therein of 5.5 lbs/minute, 18.0 lbs/minute, 503 lbs/minute and 18.2 lbs/minute respectively through line 79 to regenerator feed tank 80. This liquid aqueous solution is withdrawn from tank 80 and pumped at a temperature of 126°F. to heat exchanger 82 wherein it is preheated by indirect heat exchange with ammonium sulfate-containing aqueous solution at elevated temperature of 221°F. being passed to scrubbing section 9 of tower 6 through line 20. The preheated liquid aqueous solution is pumped from heat exchanger 82 through line 81 and at a temperature of 176°F. into the upper portion of regenerator section 33 of tower 31 above the uppermost tray in regenerator section 33. The liquid aqueous solution is withdrawn from the lower portion of regenerator section 33 through line 83, and heated in regenerator heaters 84 by indirect heat exchange with steam, after which the heated aqueous solution is re-introduced into regenerator section 33 below the lowermost tray therein. Due to the aqueous solution having been heated to its boiling point at the prevailing pressure, the dimethylaniline sulfite is decomposed to liberate gaseous dimethylaniline and $SO_2$ gas, and a considerable quantity of steam is generated. The thus-obtained gaseous dimethylaniline, $SO_2$ gas and steam pass upwardly in regenerator section 33 and into stripping section 30, wherein at least the steam is utilized as a stripping medium to strip sulfur dioxide from $SO_2$-pregnant dimethylaniline absorbent as is previously disclosed herein.

Liquid aqueous solution containing ammonium sulfate is withdrawn from regenerator section 33 through line 20 at a temperature of 221°F. and a rate of 36 g.p.m. and, after being used to preheat liquid aqueous solution containing dimethylaniline sulfite and ammonium sulfate flowing in line 81 by indirect heat exchanger in exchange 82 and then cooled by indirect cooling with cooling water in cooler 93, is passed into sulfurous acid scrubbing section 9 above the uppermost tray therein as is previously disclosed herein. Prior to being cooled and introduced into scrubbing section 9, a small amount of the liquid aqueous ammonium sulfate-containing solution containing 60 g/l ammonium sulfate is bled off through line 92 at a bleed flow rate of 10 g.p.m. The remaining major or predominant portion of liquid aqueous ammonium sulfate-containing solution is pumped, after leaving cooler 93, through line 20, at a temperature of 80°F. and a flow rate of 26 g.p.m. and at flow rates of ammonium sulfate and water contained therein of 13.0 lbs/minute and 208 lbs/minute respectively and introduced into scrubbing section 9 of tower 6 as hereinbefore disclosed.

EXAMPLE B

Referring to FIG. 2, the procedure of Example A is repeated except that in this Example B the effluent gas from sulfuric acid scrubbing section 10 passes upwardly within soda scrubbing section 104 of tower 6. The effluent gas containing a small amount of residual $SO_2$ and a small amount of residual dimethylaniline passes in intimate contact with a dilute aqueous soda solution of 10% sodium carbonate concentration in the soda scrubbing section to remove more than 50% of the $SO_2$ from the gas. The tail gas containing less than 0.05% $SO_2$ exits from scrubbing section 104 through line 18. The sodium carbonate of the soda solution reacts with the $SO_2$ to form sodium sulfite and carbon dioxide.

In the foregoing examples the symbols "g.p.m." means gallons or gallon per minute, "psia" means pounds per square inch absolute, "p.p.m." means parts per million, "g/l" means grams per liter, and "SCFM" means standard cubic feet of gas per minute, which is the cubic feet of gas per minute at standard conditions of 0°C. and 760 mm. of Hg pressure. The temperatures and flow rates set forth in the foregoing examples are average temperatures and average flow rates.

What is claimed is:

1. In a process for recovering sulfur dioxide from a gas mixture containing the same which comprises absorbing sulfur dioxide from the gas mixture by contacting the gas mixture in an absorption zone with a liquid, water-insoluble aromatic amine absorbent capable of releasing the sulfur dioxide upon subsequent treatment, scrubbing sulfur dioxide-impoverished effluent gas containing gaseous aromatic amine absorbent from said absorption zone with dilute sulfuric acid solution in an upright sulfuric acid scrubbing zone to remove residual aromatic amine absorbent from the gas, stripping sulfur dioxide from sulfur dioxide-pregnant aromatic amine absorbent in a stripping zone, and recovering the liberated sulfur dioxide from the stripping zone, the improvement which comprises subsequent to the sulfur dioxide absorbing step and prior to the sulfuric acid scrubbing, scrubbing the sulfur dioxide-impoverished effluent gas containing gaseous aromatic amine absorbent from the absorption zone in a sulfurous acid scrubbing zone with a sulfurous acid-and ammonium sulfate-containing aqueous solution, the presence of the ammonium sulfate in the aqueous solution resulting in an appreciably greater recovery of the aromatic amine in said sulfurous acid scrubbing zone than in the absence of the ammonium sulfate, the sulfurous acid- and ammonium sulfate-containing aqueous solution being formed in the sulfurous acid scrubbing zone by supplying sulfur dioxide-containing gas into said sulfurous acid scrubbing zone, the sulfur dioxide-containing gas supplied into the sulfurous acid scrubbing zone being in addition to sulfur dioxide contained in sulfur dioxide-impoverished effluent gas passing into said sulfurous acid scrubbing zone from said absorption zone, supplying a liquid aqueous solution consisting essentially of dissolved ammonium sulfate from a regenerating zone into said sulfurous acid scrubbing zone, the sulfur dioxide being dissolved in the water of the liquid aqueous solution consisting essentially of ammonium sulfate to form the sulfurous acid-and ammonium sulfate-containing aqueous solution, withdrawing liquid sulfuric acid solution containing a higher concentration of aromatic amine sulfate from a lower portion of the upright, sulfuric acid scrubbing zone and passing a portion of this withdrawn sulfuric acid solution back to an intermediate or upper portion of said sulfuric acid scrubbing zone and introducing the same therein, the higher concentration of aromatic amine sulfate in the sulfuric acid solution withdrawn from the lower portion of the sulfuric acid scrubbing zone being relative to a lower concentration of aromatic amine sulfate in a sulfuric acid solution withdrawn from an intermediate or upper portion of the sulfuric acid scrubbing zone above the point of introduction therein of the returned sulfuric acid solution containing the higher concentration of aromatic amine sulfate as hereafter specified, withdrawing the liquid sulfuric acid solution containing the lower concentration of aromatic amine sulfate from an intermediate or upper portion of the upright, sulfuric acid scrubbing zone above the point of introduction therein of the returned sulfuric acid solution having the higher concentration of aromatic amine sulfate and passing this withdrawn sulfuric acid solution having the lower concentration of aromatic amine sulfate back to a top portion of the sulfuric acid scrubbing zone and introducing the same therein, combining scrubbing aqueous solution containing aromatic amine sulfite and scrubbing aqueous solution containing aromatic amine sulfate from the sulfurous acid and sulfuric acid scrubbing zones respectively, adding ammonia to the combined scrubbing solutions in a separating zone, the ammonia being added to the combined solutions in amount sufficient to result in the release of the aromatic amine from the aromatic amine sulfate therein and formation of ammonium sulfate in said separating zone, separating the liquid aromatic amine from an aqueous liquid phase containing the ammonium sulfate and aromatic amine sulfite in said separating zone, withdrawing separated liquid aromatic amine from the separating zone and returning the withdrawn liquid aromatic amine ultimately to the sulfur dioxide absorbing step in the absorption zone, withdrawing aqueous liquid phase containing the aromatic amine sulfite from said separating zone and passing the aqueous liquid phase to the regenerating zone, heating said aqueous liquid phase in the regenerating zone to decompsoe the aromatic amine sulfite and liberate gaseous aromatic amine and sulfur dioxide gas and generate steam, passing the gaseous aromatic amine, sulfur dioxide gas and steam into the stripping zone, and withdrawing a liquid aqueous solution consisting essentially of dissolved ammonium sulfate from the regenerating zone and passing more than 50% by volume of the withdrawn liquid aqueous solution consisting essentially of dissolved ammonium sulfate for supply into the sulfurous acid scrubbing zone as aforesaid, a reduced amount of sulfuric acid solution being required for removal of the residual aromatic amine absorbent from the gas in the sulfuric acid scrubbing zone due to the scrubbing removal of the aromatic amine from the gas with the sulfurous acid-and ammonium sulfate-containing aqueous solution in the sulfurous acid scrubbing zone than in the absence of the ammonium sulfate.

2. The process of claim 1 wherein the sulfuric acid upright scrubbing zone is a vertically elongated scrubbing zone equipped with a plurality of spaced apart trays.

3. The process of claim 2 wherein the quantities of withdrawn dilute sulfuric acid solution having the higher concentration of aromatic amine sulfate and the withdrawn dilute sulfuric acid solution having the lower concentration of aromatic amine sulfate which are returned back to and introduced into respectively the intermediate or upper portion of the scrubbing zone and the top portion of the scrubbing zone above the uppermost tray therein are sufficient to maintain all trays of the scrubbing zone substantially filled with liquid pools of the acid solution.

4. The process of claim 3 wherein the effluent gas containing residual sulfur dioxide from the sulfuric acid scrubbing zone is scrubbed in an alkali metal carbonate scrubbing zone with a liquid alkali metal carbonate solution, to remove more than 50% of the residual sulfur dioxide from the gas.

5. The process of claim 4 wherein the alkali metal carbonate solution is a dilute aqueous alkali metal carbonate solution.

6. The process of claim 5 wherein the alkali metal carbonate is sodium carbonate.

7. The process of claim 4 wherein the liquid sulfuric acid solution having the higher concentration of aromatic amine sulfate is withdrawn from a lowermost tray in the scrubbing zone and introduced onto a third or fourth tray from the top of said zone, and the liquid sulfuric acid solution having the lower concentration of aromatic amine sulfate is withdrawn from respectively the second or third tray from the top of said scrubbing zone which is above said third or fourth tray onto which said sulfuric acid solution having the higher concentration of aromatic amine sulfate is introduced and introduced into said zone above an uppermost tray therein.

8. The process of claim 3 wherein the aromatic amine is dimethylaniline.

9. The process of claim 3 wherein the aromatic amine is xylidine present in xylidine-water mixture.

10. The process of claim 4 wherein the alkali metal carbonate is sodium carbonate.

11. The process of claim 4 wherein the aromatic amine is dimethylaniline.

12. The process of claim 1 wherein the effluent gas containing residual sulfur dioxide from the sulfuric acid scrubbing zone is scrubbed in an alkali metal carbonate scrubbing zone with a liquid alkali metal carbonate solution, to remove more than 50% of residual sulfur dioxide from the gas.

13. The process of claim 12 wherein the alkali metal carbonate solution is a dilute aqueous alkali metal carbonate solution.

14. The process of claim 13 wherein the alkali metal carbonate is sodium carbonate.

15. The process of claim 12 wherein the aromatic amine is dimethylaniline.

16. The process of claim 12 wherein the alkali metal carbonate is sodium carbonate.

17. The process of claim 12 wherein the aromatic amine is xylidine present in a xylidine-water mixture.

18. The process of claim 1 wherein the sulfur dioxide other than the sulfur dioxide contained in the $SO_2$-impoverished effluent gas from the absorbing step is supplied into the sulfurous acid scrubber zone in amount sufficient to form an amount of sulfurous acid therein by dissolution in water which is at least equivalent to the content of aromatic amine in effluent gas passing into said scrubber zone from the sulfur dioxide absorbing step but which is insufficient to result in an amount of sulfur dioxide gas in excess of 0.10% by volume $SO_2$ in a tail gas from the sulfuric acid scrubbing zone.

19. The process of claim 18 wherein the sulfur dioxide gas other than the sulfur dioxide contained in the $SO_2$-impoverished effluent gas from the absorbing step is supplied into the sulfurous acid scrubber zone in amount sufficient to form an amount of sulfurous acid therein which is in excess of an amount thereof equivalent to the content of aromatic amine in the effluent gas passing into said scrubber zone from the sulfur dioxide absorbing step but which is insufficient to result in an amount of sulfur dioxide in excess of 0.10% by volume SO$_2$ in the tail gas from the sulfuric acid scrubbing zone.

20. The process of claim 18 wherein the sulfur dioxide-containing gas supplied into the sulfurous acid-scrubbing zone is substantially pure SO$_2$ gas obtained from elsewhere in the process.

21. The process of claim 1 wherein the amount of ammonia added to the combined aqueous solutions in the separating zone is at least equivalent to the total content of sulfate radical present in aromatic amine sulfate contained in the combined aqueous solutions.

22. The process of claim 21 wherein the amount of ammonia added to the combined aqueous solutions in the separating zone is equivalent to the total content of sulfate radical present in aromatic amine sulfate contained in the combined aqueous solutions.

23. The process of claim 1 wherein the ammonia is added to the combined liquid aqueous solutions in at least two separating zones, the ammonia being added to the combined liquid aqueous solutions in a first stage separating zone in an amount sufficient to result in the release of the aromatic amine from a portion of aromatic amine sulfate present therein and the formation of ammonium sulfate, separated liquid aromatic amine being withdrawn from the first stage separating zone and returned ultimately to the sulfur dioxide-absorbing step, liquid aqueous solution containing ammonium sulfate, the aromatic amine sulfite, and residual aromatic amine sulfate being withdrawn from a separate layer thereof in the first stage separating zone and passed into a second stage separating zone, the ammonia being added to the liquid aqueous solution in the second stage separating zone in an amount sufficient to result in the release of substantially all aromatic amine from the residual aromatic amine sulfate in the aqueous solution, liberated liquid aromatic amine being separated from aqueous liquid solution in the second stage separator zone, the separated liquid aromatic amine being withdrawn from the second stage separating zone and returned ultimately to the sulfur dioxide-absorbing step, and separated aqueous liquid solution containing ammonium sulfate and aromatic amine sulfite being withdrawn from the second stage separating zone and passed to the regenerator zone.

24. The process of claim 23 wherein the ammonia is added to the combined liquid aqueous solutions in two separating zones.

25. The process of claim 1 wherein the aromatic amine is xylidine present in a xylidine-water mixture.

26. The process of claim 1 wherein a stripped liquid aromatic amine absorbent-water mixture is passed from the stripping zone to a separating zone for separation of the aromatic amine absorbent from the water.

27. The process of claim 1 wherein the aromatic amine is dimethylaniline.

28. The process of claim 1 wherein the ammonia is added as ammonia gas.

29. The process of claim 1 wherein the amount of ammonia added to the combined aqueous solutions in the separating zone is sufficient to result in the liquid aqueous solution at a lower portion of the regenerating zone having a pH in the range of 4.5 to 5.0.

30. The process of claim 1 wherein the liquid aqueous ammonium sulfate-containing solution is withdrawn at elevated temperature from the regenerating zone and, prior to being passed to the sulfurous acid scrubbing zone, is passed in indirect heat exchange relationship with an aromatic amine sulfite-containing aqueous solution being passed to the regenerating zone to thereby preheat the last-mentioned aqueous solution prior to its introduction into the regenerating zone and to thereby cool the ammonium sulfate-containing solution prior to its introduction into the sulfurous acid scrubbing zone.

31. The process of claim 1 wherein about 65% to about 90% by volume of the withdrawn liquid aqueous ammonium sulfate-containing solution from the regenerating zone is passed to the sulfurous acid scrubbing zone.

32. The process of claim 1 wherein the amount of ammonia added to the combined aqueous solutions in the separating zone is sufficient to result in the liquid aqueous solution at a lower portion of the regenerating zone having a pH in the range of 4 to 5.

* * * * *

UNITED STATES PATENT OFFICE
CERTIFICATE OF CORRECTION

Patent No. 3,980,760      Dated September 14, 1976

Inventor(s)    James M. Henderson et al.

It is certified that error appears in the above-identified patent and that said Letters Patent are hereby corrected as shown below:

Title and ABSTRACT page, first column, the Assignee should read --ASARCO Incorporated-- instead of "Asarco Incorporated". In the "ABSTRACT", second column, line 37, "aminesulfurous" should read --amine-sulfurous--. Column 1, line 33, --sulfite-- should be inserted after "sodium" and before "and"; line 41, "collectng" should read --collecting--. Column 3, line 3, "of" should read --or--. Column 8, line 50, "1." should read --(1)--; line 50, -- → -- should be inserted after "$SO_2$" and before "$Na_2SO_3$". Column 9, line 3, "2" (first occurrence) should read --(2)--; line 45, "3" (first occurrence) should read --(3)--; line 52, "4" (first occurrence) should read --(4)--; line 62, "5" should read --(5)--. Column 19, line 56, a hyphen should be inserted after "base" and before "sulfuric". Column 24, line 65, "thereon" should read --thereof--. Column 27, line 33, "decompsoe" should read --decompose--.

Signed and Sealed this

Seventeenth Day of May 1977

[SEAL]

Attest:

RUTH C. MASON
*Attesting Officer*

C. MARSHALL DANN
*Commissioner of Patents and Trademarks*